(12) United States Patent
Howard et al.

(10) Patent No.: US 11,846,390 B2
(45) Date of Patent: Dec. 19, 2023

(54) PASS-THROUGH RATCHETING MECHANISM

(71) Applicant: META PLATFORMS TECHNOLOGIES, LLC

(72) Inventors: Jason Howard, Alpharetta, CA (US); Thomas Christopher Frey, Seattle, WA (US); Karthik Kadirvel, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 94 days.

(21) Appl. No.: 17/334,498

(22) Filed: May 28, 2021

(65) Prior Publication Data

US 2021/0381639 A1  Dec. 9, 2021

Related U.S. Application Data

(60) Provisional application No. 63/034,871, filed on Jun. 4, 2020.

(51) Int. Cl.
  *G06F 1/16* (2006.01)
  *F16M 13/04* (2006.01)
  *A44C 5/00* (2006.01)

(52) U.S. Cl.
  CPC ............ *F16M 13/04* (2013.01); *A44C 5/0069* (2013.01); *G06F 1/163* (2013.01)

(58) Field of Classification Search
  CPC ....... G06F 1/163; F16M 13/04; A44C 5/0069; A42B 3/145; G02B 27/0176
  See application file for complete search history.

(56) References Cited

U.S. PATENT DOCUMENTS

| 5,950,245 A | 9/1999 | Binduga |
| 6,652,469 B2 | 11/2003 | Pinsonnault et al. |
| 7,707,695 B2 * | 5/2010 | Dubois ................ A42B 3/145 2/418 |

(Continued)

FOREIGN PATENT DOCUMENTS

| DE | 202019103344 U1 * | 8/2019 |
| EP | 2937005 B1 | 1/2018 |

(Continued)

OTHER PUBLICATIONS

Invitation to Pay Additional Fees received for PCT Application Serial No. PCT/US2021/035530 dated Sep. 1, 2021, 9 pages.

(Continued)

*Primary Examiner* — Rockshana D Chowdhury
(74) *Attorney, Agent, or Firm* — Greenberg Traurig, LLP

(57) ABSTRACT

The disclosed adjustable strap apparatus may include a left strap having a first rack member and a right strap having a second rack member. An electrical unit may have an opening through which a shaft passes. A pinion member may be affixed to a proximal end of the shaft and may be adapted to (a) engage the first rack member and the second rack member and (b) translate the first rack member and the second rack member in opposite directions via rotation of the shaft. A ratcheting member may be coupled to a distal end of the shaft and may include one or more pawls adapted to prevent rotation of the shaft when engaged. Various other methods, systems, and devices are also disclosed.

24 Claims, 25 Drawing Sheets

(56) References Cited

U.S. PATENT DOCUMENTS

| | | |
|---|---|---|
| 9,622,535 B2 | 4/2017 | Windham et al. |
| 9,837,682 B1* | 12/2017 | Nikkhoo ................ G06F 1/1613 |
| 9,864,406 B2 | 1/2018 | Miller et al. |
| 10,251,289 B2* | 4/2019 | Chen ................... G02B 27/0176 |
| 10,502,363 B2* | 12/2019 | Edwards ................ F16M 13/04 |
| 10,746,351 B1 | 8/2020 | Ellis et al. |
| 10,774,987 B2* | 9/2020 | Xu ........................... G06F 3/011 |
| 10,873,799 B2* | 12/2020 | Wang ..................... H04R 1/028 |
| 11,163,333 B2* | 11/2021 | Lin ....................... H04N 5/7491 |
| 11,419,391 B2* | 8/2022 | Dong ..................... F16H 19/04 |
| 2005/0128735 A1 | 6/2005 | Atkins et al. |
| 2009/0183739 A1 | 7/2009 | Wondka |
| 2012/0297520 A1* | 11/2012 | Gleason ................. A42B 3/142 2/181 |
| 2018/0348812 A1 | 12/2018 | Miller et al. |
| 2019/0037715 A1* | 1/2019 | Chen ..................... G02B 7/002 |
| 2019/0196536 A1* | 6/2019 | Wang ...................... G06F 3/011 |
| 2019/0220056 A1* | 7/2019 | Yan ..................... G02B 27/0176 |
| 2019/0302836 A1* | 10/2019 | Xu .......................... G02B 27/01 |
| 2019/0339736 A1* | 11/2019 | Chang .................... A42B 3/145 |
| 2020/0310488 A1* | 10/2020 | Lin ................... G02B 27/0176 |
| 2021/0315301 A1* | 10/2021 | Wang ..................... A41D 20/00 |

FOREIGN PATENT DOCUMENTS

| | | |
|---|---|---|
| JP | H11324940 A | 11/1999 |
| WO | 2020021951 A1 | 1/2020 |

OTHER PUBLICATIONS

International Search Report and Written Opinion for International Application No. PCT/US2021/035530, dated Oct. 22, 2021, 15 pages.

International Preliminary Report on Patentability for International Application No. PCT/US2021/035530, dated Dec. 15, 2022, 12 pages.

International Preliminary Report on Patentability for International ApplicationNo. PCT/US2021/044233, dated Feb. 16, 2022, 13 pages.

International Search Report and Written Opinion for International Application No. PCT/US2021/044233, dated Oct. 29, 2021, 15 pages.

Machine Translation of JP2019525261A, 2019, 23 pages.

Machine Translation of JPH11324940A, 1999, 11 pages.

* cited by examiner

PASS-THROUGH RATCHETING MECHANISM

CROSS REFERENCE TO RELATED APPLICATION

This application claims the benefit of U.S. Provisional Application No. 63/034,871, filed 4 Jun. 2020, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
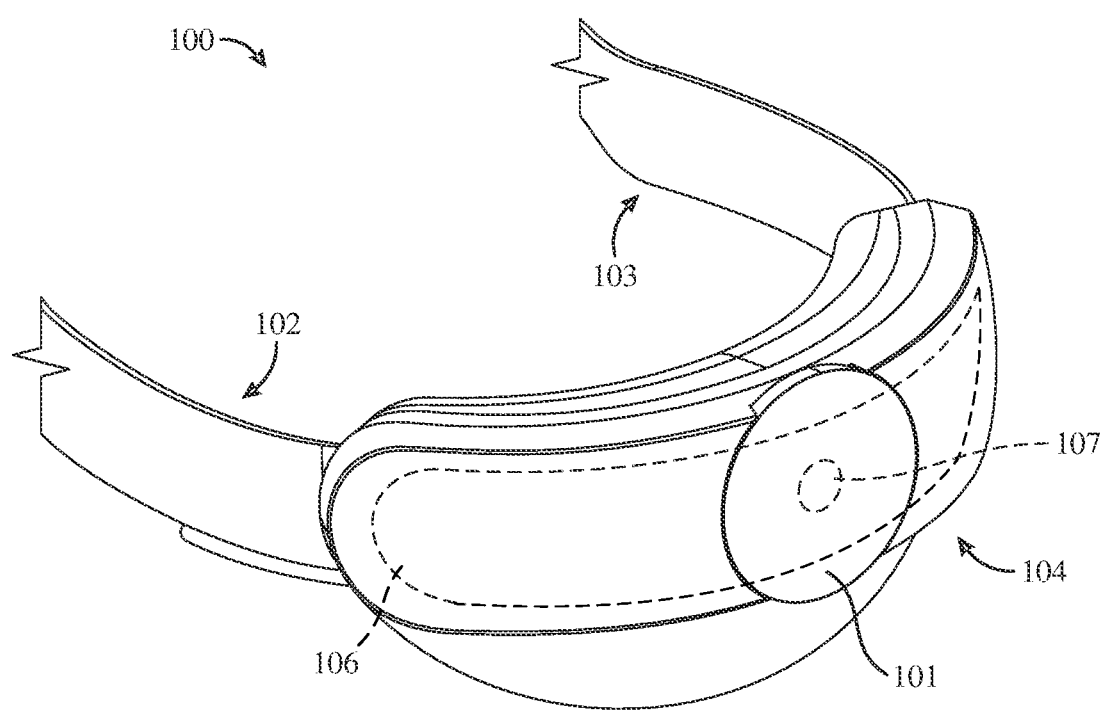
FIG. 1 is a perspective view of an exemplary adjustable strap assembly, according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives.

DETAILED DESCRIPTION OF EXEMPLARY EMBODIMENTS

Head-mounted display (HMD) devices have wide applications in various fields, including engineering, design, medical surgery practice, military simulated practice, and video gaming. For example, virtual-reality HMD devices may allow users to experience realistic, immersive virtual environments while playing video games, during flight-simulation training, or when interacting with co-workers around the globe.

Conventional HMD devices typically include simple adjustable strap systems that hold the HMD devices on users' heads and against users' faces. Unfortunately, due to their weight and the forward placement of internal electrical components such as batteries, traditional HMD devices may cause a certain degree of discomfort and/or awkwardness when worn. For example, since users typically wear HMD devices over their eyes, such HMD devices may weigh down the front of the users' heads relative to the back of the users' heads. It may be advantageous to place some of the electrical components of an HMD device (e.g., batteries, compute units, memory units, tracking units, communication units, etc.) nearer the back of users' heads to improve weight distribution among other aspects of the HMD device. Accordingly, the instant disclosure identifies and addresses a need for adjustable strap systems for HMD devices that enable some of the HMD devices' internal electrical components (either necessary or supplementary) to be located nearer the back of users' heads.

The present disclosure is generally directed to designs for adjustable strap devices having pass-through ratcheting mechanisms. Embodiments of the present disclosure may include a pass-through ratcheting mechanism for an adjustable HMD strap assembly having an integrated battery. In some embodiments, straps may be adjusted using a rack and pinion system that are located on an inner side of an integrated battery, and a ratcheting dial for driving/locking the pinion may be located on an outer side of the integrated battery. A shaft may pass through the integrated battery and connect the pinion to the ratcheting dial. In some embodiments, the shaft may pass through a hole in a protection control module of the integrated battery. In some embodiments, the ratcheting dial may include one or more pawls that engage teeth of an inner gear integrated into an outer housing of the adjustable HMD strap assembly.

Features from any of the embodiments described herein may be used in combination with one another in accordance with the general principles described herein. These and other embodiments, features, and advantages will be more fully understood upon reading the following detailed description in conjunction with the accompanying drawings.

The following will provide, with reference to FIGS. 1-18, detailed descriptions of example strap assemblies having pass-through ratcheting mechanisms. With reference to FIG. 19, the following will provide detailed descriptions of an example method for manufacturing an adjustable strap device. With reference to FIGS. 20-25, the following will provide detailed descriptions of various artificial-reality systems and components that may implement embodiments of the present disclosure.

FIG. 1 is a perspective view of an adjustable strap system 100, according to at least one embodiment of the present disclosure. In some embodiments, adjustable strap system 100 may be an adjustable strap system for a head-worn device (e.g., an HMD) that allows a user (e.g., a wearer of the HMD) to rotate an adjustment knob 101, located at a rear of a backpiece 104, to set a proper tension and/or length of a left strap 102 and/or a right strap 103 for the user when donning the head-worn device. For example, the user may rotate adjustment knob 101 in a tightening direction (e.g., a clockwise direction when viewed from the rear of adjustable strap system 100 as shown in FIG. 1) that decreases a length of left strap 102 and/or right strap 103. Proximal ends of left strap 102 and right strap 103 may be secured to a head-worn device, such as virtual-reality system 2200 of FIG. 22 and/or head-mounted display 2402 of FIG. 24. Distal ends of left strap 102 and right strap 103 may be secured within backpiece 104. In some examples, left strap 102 and right strap 103 may be formed of a flexible material to wrap around and/or conform to the user's head.

As adjustment knob 101 is rotated in the tightening direction, the relative lengths of left strap 102 and/or right strap 103 may decrease, and left strap 102 and right strap 103 may tighten (e.g., increase tension in) around a user's head to increase a force of the head-worn device against the user's face. The user may don the head-worn device and rotate adjustment knob 101 until a comfortable tension setting is reached. Additionally or alternatively, the user may desire to decrease the tension (e.g., loosen) of the head-worn device by rotating adjustment knob 101 in a disengaging direction (e.g., a counterclockwise direction when viewed from the rear of adjustable strap system 100 as shown in FIG. 1). Rotating adjustment knob 101 in a loosening direction may increase the relative lengths of left strap 102 and/or right strap 103 thereby decreasing the tension of the head-worn device against the user's face. As will be described in detail below, rotating adjustment knob 101 may cause a length adjustment mechanism (e.g., a rack and pinion mechanism) to increase and/or decrease the lengths of left strap 102 and/or right strap 103.

Figure 2:
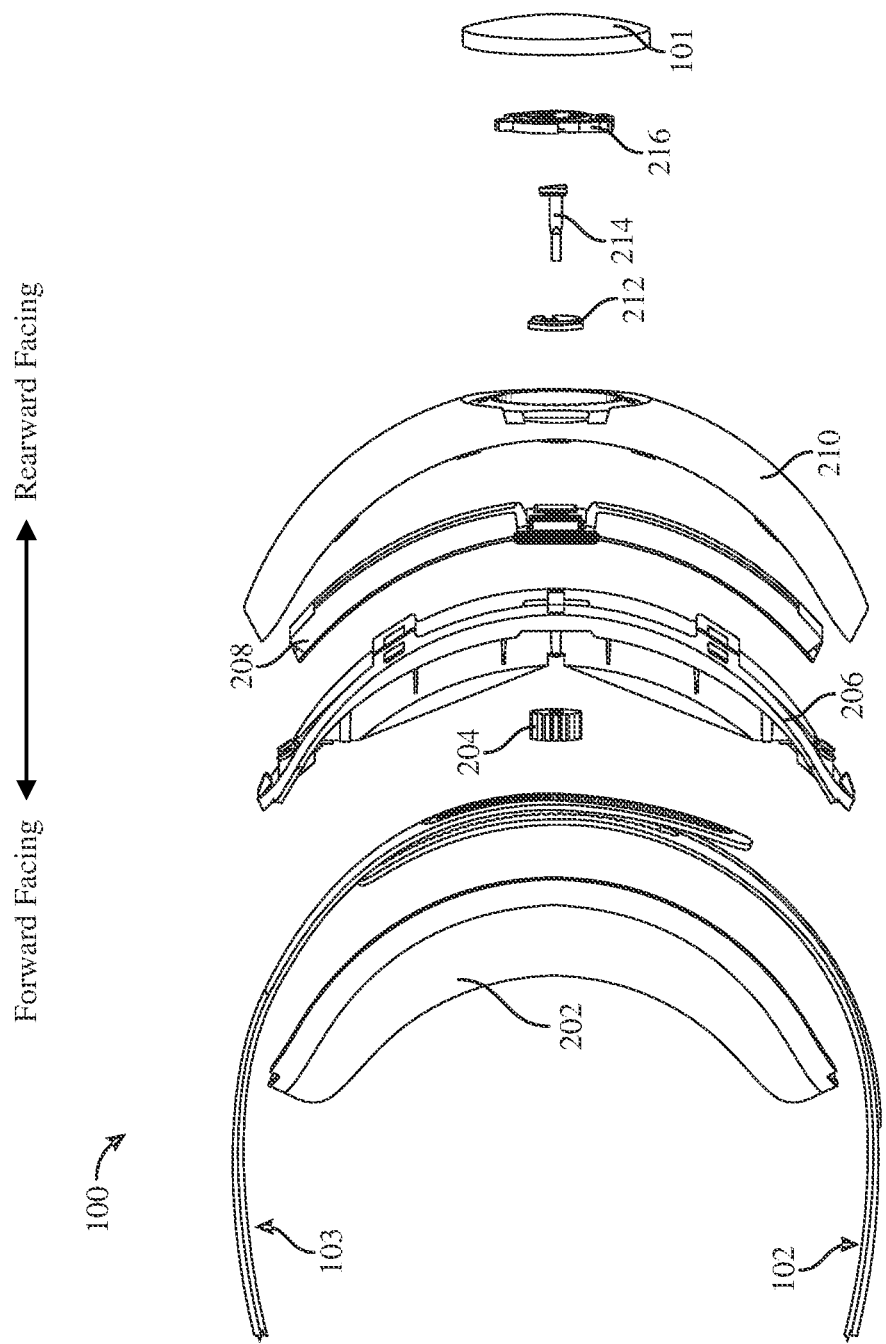
FIG. 2 is an exploded view of the exemplary adjustable strap assembly of FIG. 1, according to some embodiments.

In some examples, adjustable strap system 100 may include an internal electrical component 106 contained within backpiece 104. Electrical component 106 may include an enclosed or and unenclosed opening 107 (e.g., a hole, notch, slit, aperture, etc.) through which a shaft (e.g., a pass-through shaft 214 as shown in FIG. 2) may extend or reach from a forward-facing side of electrical component 106 to a rearward-facing side of electrical component 106. In some embodiments, electrical component 106 may include or represent a physical processor, a physical memory, a power source (e.g., a battery assembly 208 as shown in FIG. 2), a circuit board, an integrated circuit (IC), an IC package (e.g., a System in a Package (SiP), a Multi-Chip Module (MCM), or a Three-Dimensional Integrated Circuit (3D IC)), variations or combinations of one or more of the same, or any other type of form of electrical or electronic component. Examples of power sources include, without limitation, capacitors, solar converters, lithium-ion batteries, lithium-polymer batteries, primary lithium batteries, alkaline batteries, or any other form of power storage. The power source may be charged via a wired and/or wireless connection to an external power source. The power source may be configured to provide power to a head-worn device coupled to adjustable strap system 100. In at least one embodiment, electrical component 106 may include or represent a curved battery pack.

In some examples, adjustable strap system 100 may allow a user to rotate adjustment knob 101 until a comfortable tension setting is reached and provide additional travel length in left strap 102 and/or right strap 103 to allow a user to doff (e.g., remove) the head-worn device by pulling the device away from the user's face and lifting the device off the user's head without rotating adjustment knob 101 in the disengaging direction. As will be further explained below, adjustable strap system 100 may include at least one retaining element (e.g., a ratcheting element 216 as shown in FIG. 2) that can maintain the lengths of straps 102 and 103 and/or hold the tension set by the user.

FIG. 2 is an exploded view of exemplary adjustable strap system 100, according to at least one embodiment of the present disclosure. As shown in FIG. 2, adjustable strap system 100 may further include a forward strap housing 202, a pinion gear 204, a rear strap housing 206, a battery assembly 208, a battery housing 210, a retaining element 212, a pass-through shaft 214, and a ratcheting element 216. Distal ends of left strap 102 and right strap 103 may be disposed, concealed, protected, and/or secured between forward strap housing 202 and rear strap housing 206. Teeth of pinion gear 204 may mesh with corresponding teeth of gear racks of left strap 102 and right strap 103.

In some embodiments, forward strap housing 202 and rear strap housing 206 may be sized and shaped to maintain the relative positions and orientations of pinion gear 204 and straps 102 and 103. Battery assembly 208 may be concealed, protected, and/or secured between rear strap housing 206 and battery housing 210. Retaining element 212 may couple (e.g., via suitable fasteners) pass-through shaft 214 to ratcheting element 216 and/or adjustment knob 101. Rear strap housing 206, battery assembly 208, battery housing 210 may each include an enclosed or unenclosed opening through which pass-through shaft 214 may couple pinion gear 204 to ratcheting element 216 and adjustment knob 101 through battery assembly 208.

Figure 3:
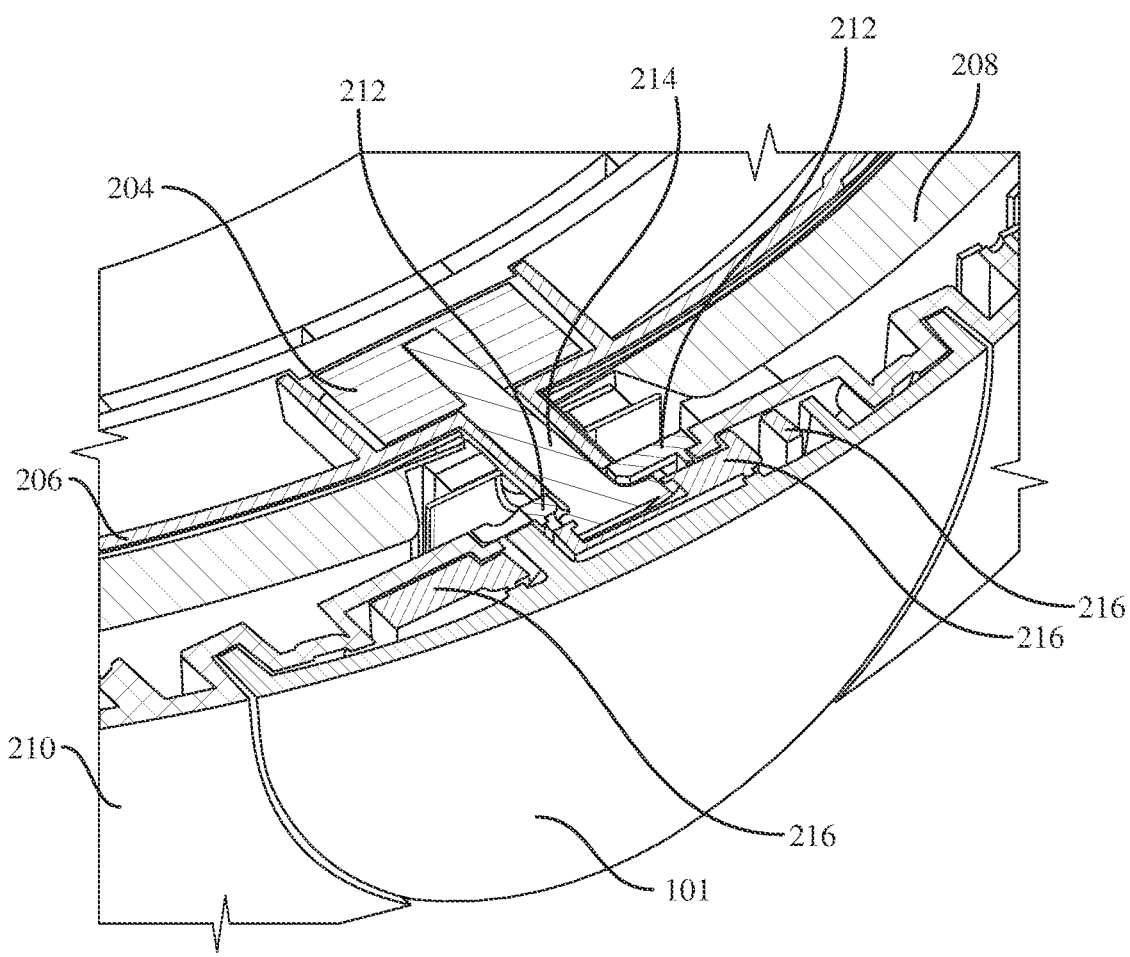
FIG. 3 is a section view of the exemplary adjustable strap assembly of FIG. 1, according to some embodiments.

FIG. 3 is a cutaway view of adjustable strap system 100 illustrating the relative positions of the components illustrated in FIG. 2, according to at least one embodiment of the present disclosure. As shown, pinion gear 204 may be disposed forward of rear strap housing 206, battery assembly 208 may be disposed between rear strap housing 206 and battery housing 210, and retaining element 212, ratcheting element 216, and adjustment knob 101 may be disposed rearward of battery housing 210. In this example, pass-through shaft 214 may couple pinion gear 204 to ratcheting element 216 and adjustment knob 101 through rear strap housing 206, battery assembly 208, and battery housing 210.

Figure 4:
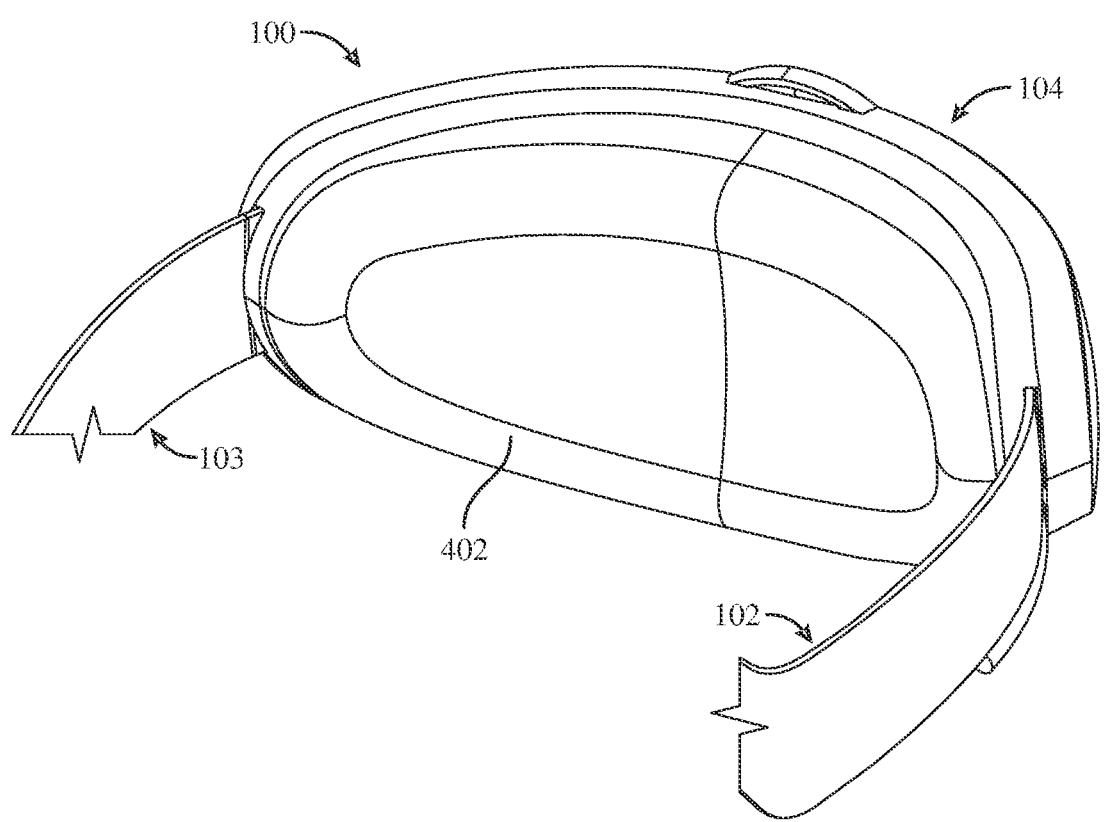
FIG. 4 is another perspective view of the exemplary adjustable strap assembly of FIG. 1, according to some embodiments.
Figure 5:
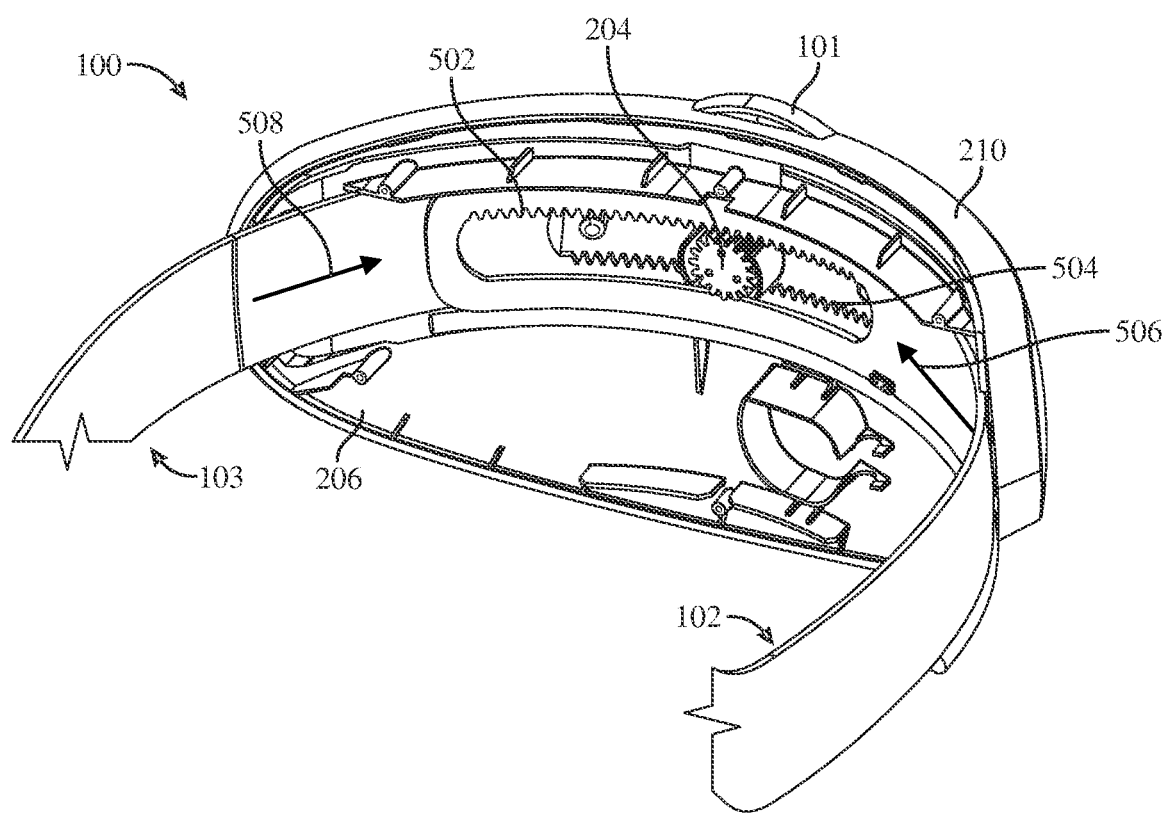
FIG. 5 is a cutaway view of exemplary components of the exemplary adjustable strap assembly of FIG. 4, according to some embodiments.

FIG. 4 is a perspective view of adjustable strap system 100, according to at least one embodiment of the present disclosure. As shown, adjustable strap system 100 may further include a cushion 402 shaped to rest against the back of a user's head (e.g., around the user's occipital lobe). Adjustment knob 101 may be sized to extend above a top of backpiece 104 for ease of access. In some embodiments, strap housings 202 and 206 may provide an aesthetically pleasing look for adjustable strap system 100 and may function as guides for left strap 102 and right strap 103 as left strap 102 and right strap 103 are lengthened or shortened.

Figure 6:
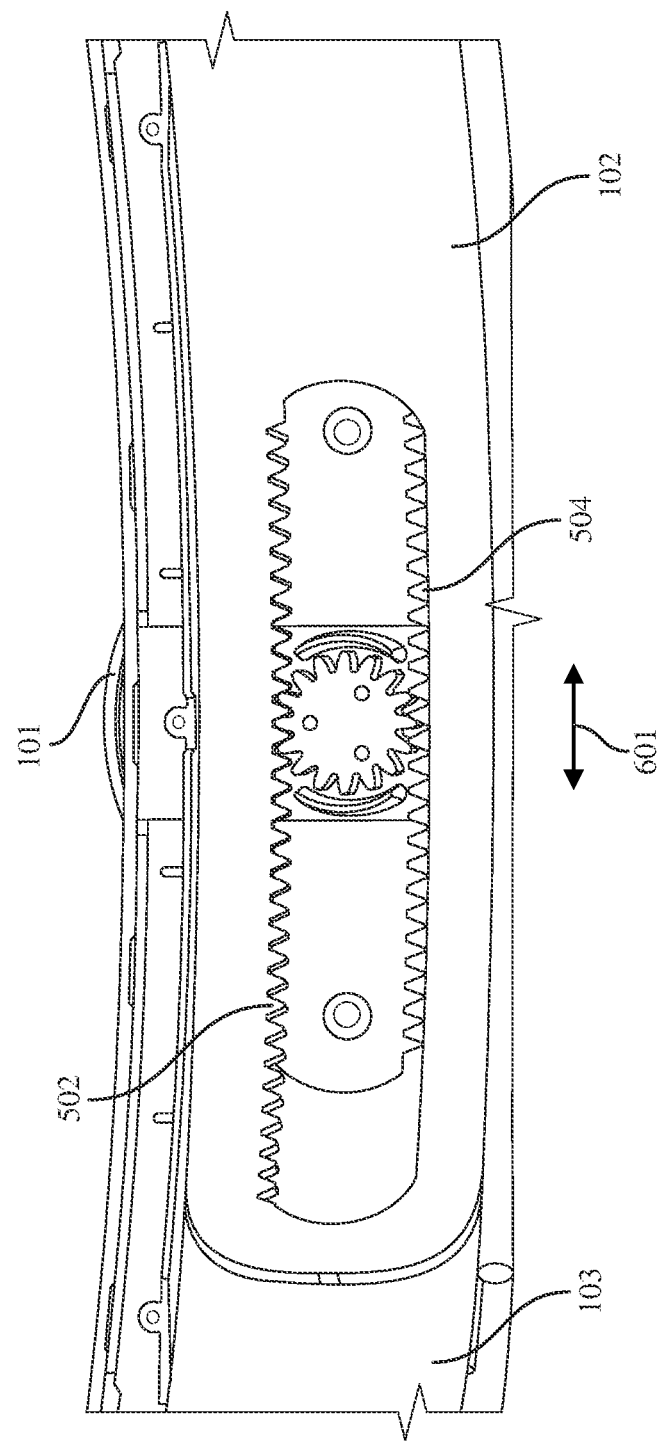
FIG. 6 is another cutaway view of some of the exemplary components of FIG. 4, according to some embodiments.

FIGS. 5-8 are cutaway views of adjustable strap system 100, according to at least one embodiment of the present disclosure. As shown, straps 102 and 103 may include gear racks that engage pinion gear 204. For example, left strap 102 may include a top rack 502, and right strap 103 may include a bottom rack 504. When pinion gear 204 is rotated, pinion gear 204 may travel along racks 502 and 504 and cause straps 102 and 103 to lengthen or shorten. In this embodiment, distal ends of left strap 102 and right strap 103 may include elongate openings (e.g., openings 802 shown in FIG. 8) in which top rack 502 and bottom rack 504 may be located. In some embodiments, the elongate openings of straps 102 and 103 may have heights substantially equal to the diameter of pinion gear 204 such that pinion gear 204 maintains its engagement with racks 502 and 504 (e.g., as shown in FIG. 6).

As described above with reference to FIG. 1, adjustment knob 101 may be rotated in an engaging direction to cause the lengths of left strap 102 and/or right strap 103 outside of strap housings 202 and 206 to decrease. Rotation of adjustment knob 101 may cause pass-through shaft 214 to rotate pinion gear 204. Pinion gear 204 may be configured and positioned to engage with (e.g., mesh with) gear teeth of top rack 502 and bottom rack 504 such that rotation of pinion gear 204 causes lateral motion of top rack 502 and bottom rack 504. The lateral motion of top rack 502 and bottom rack 504 in the directions indicated by arrow 601 may, in turn, result in tightening or loosening of left strap 102 and/or right strap 103.

When adjustment knob 101 is rotated in an engaging (e.g., tightening, shortening) direction, pinion gear 204 may rotate in a counterclockwise direction (as viewed from the perspectives of FIGS. 5-7) such that top rack 502 moves in a direction indicated by an arrow 506 and bottom rack 504 moves in a direction indicated by an arrow 508. This engaging movement of top rack 502 and bottom rack 504 may cause a decrease in the length of left strap 102 and/or right strap 103 outside of strap housings 202 and 206. Similarly, when adjustment knob 101 is rotated in a disengaging direction, pinion gear 204 may rotate in a clockwise direction (as viewed from the perspectives of FIGS. 5-7) such that top rack 502 moves in a direction opposite the direction indicated by arrow 506 and bottom rack 504 moves in a direction opposite the direction indicated by arrow 508. This disengaging movement of top rack 502 and bottom rack 504 may cause an increase in the length of left strap 102 and/or right strap 103. As noted above, left strap 102 and right strap 103 may be secured to a head-worn device. Ratcheting element 216 may hold a tension set by the user by retaining the lengths of straps 102 and 103.

Figure 7:
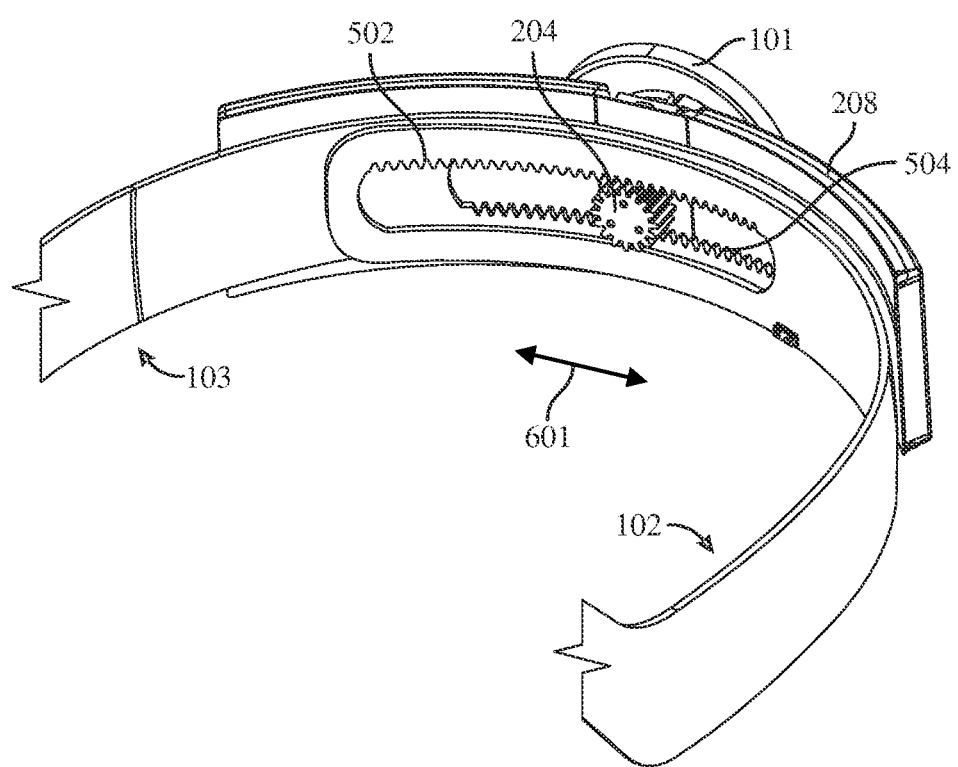
FIG. 7 is another cutaway view of some of the exemplary components of FIG. 4, according to some embodiments.
Figure 8:
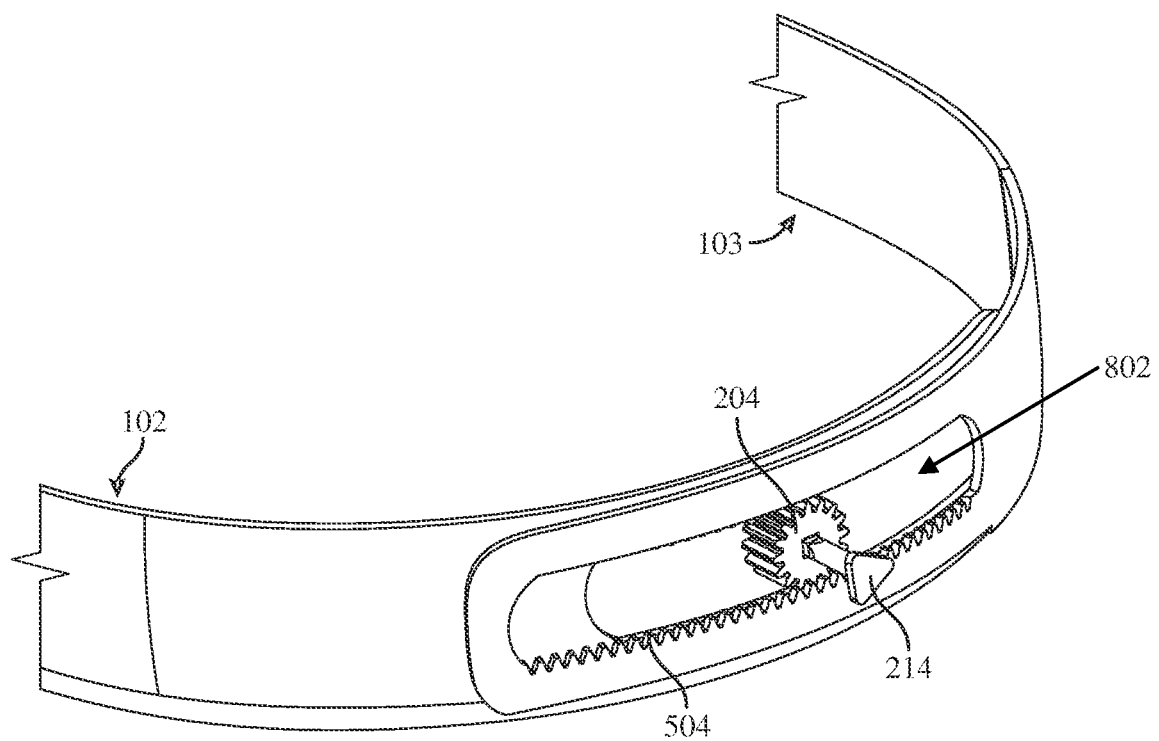
FIG. 8 is another cutaway view of some of the exemplary components of FIG. 4, according to some embodiments.

As shown in FIG. 7, adjustment knob 101 may be connected to pinion gear 204 through battery assembly 208 by pass-through shaft 214 such that a rotation of adjustment knob 101 may cause a corresponding rotation of pinion gear 204. When adjustment knob 101 is rotated, pinion gear 204 may rotate in the same direction such that left strap 102 and right strap 103 translate horizontally in opposite directions indicated by arrow 601.

Figure 9:
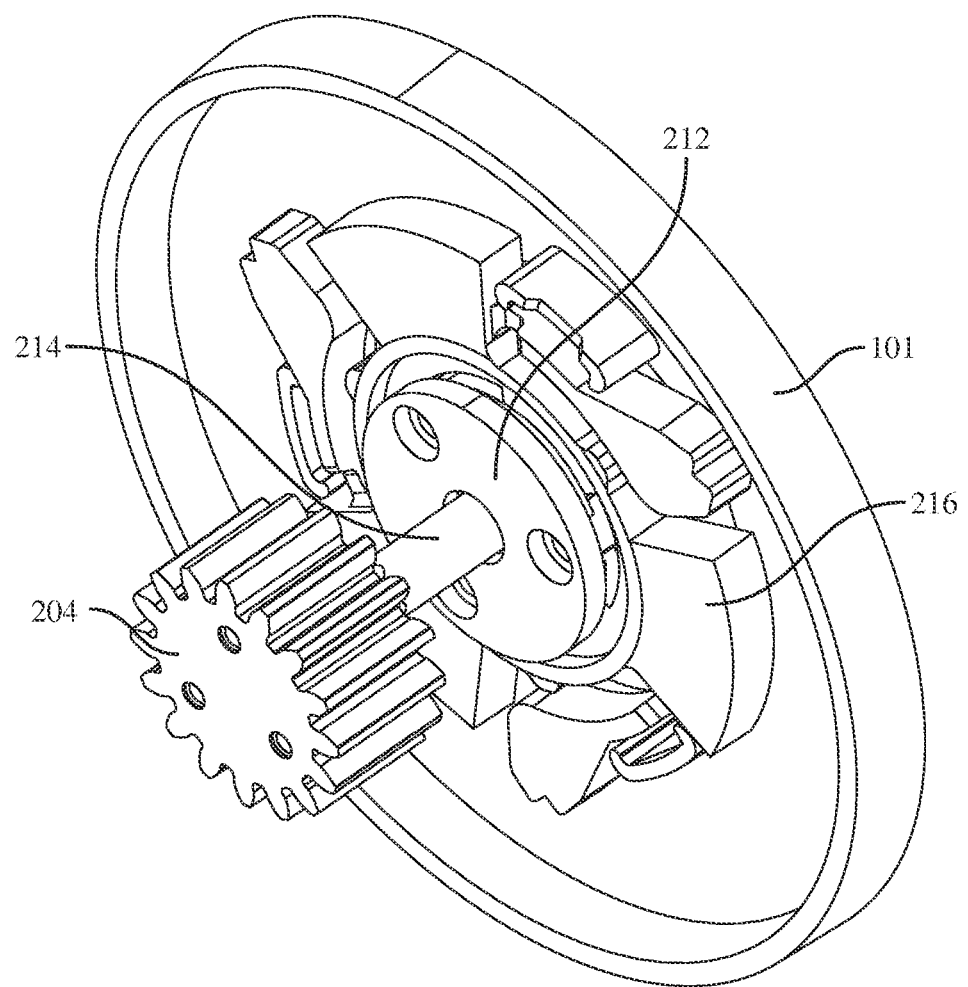
FIG. 9 is a perspective view of exemplary pass-through and ratcheting components, according to some embodiments.

FIG. 9 is an illustration showing the connection of pinion gear 204 to adjustment knob 101. As shown, pinion gear 204 may be coupled to one end of pass-through shaft 214, while adjustment knob 101 may be coupled to the other end of pass-through shaft 214. In some examples, retaining element 212 may couple adjustment knob 101 and ratcheting element 216 to pass-through shaft 214 (e.g., with screws). In some embodiments, one or more of the components illustrated in FIG. 9 may represent a single monolithic element. For example, pinion gear 204 and pass-through shaft 214 may represent a single monolithic element that is later coupled to ratcheting element 216. In another example, pass-through shaft 214, ratcheting element 216, and/or adjustment knob 101 may represent a single monolithic element that is later coupled to pinion gear 204.

Figure 10:
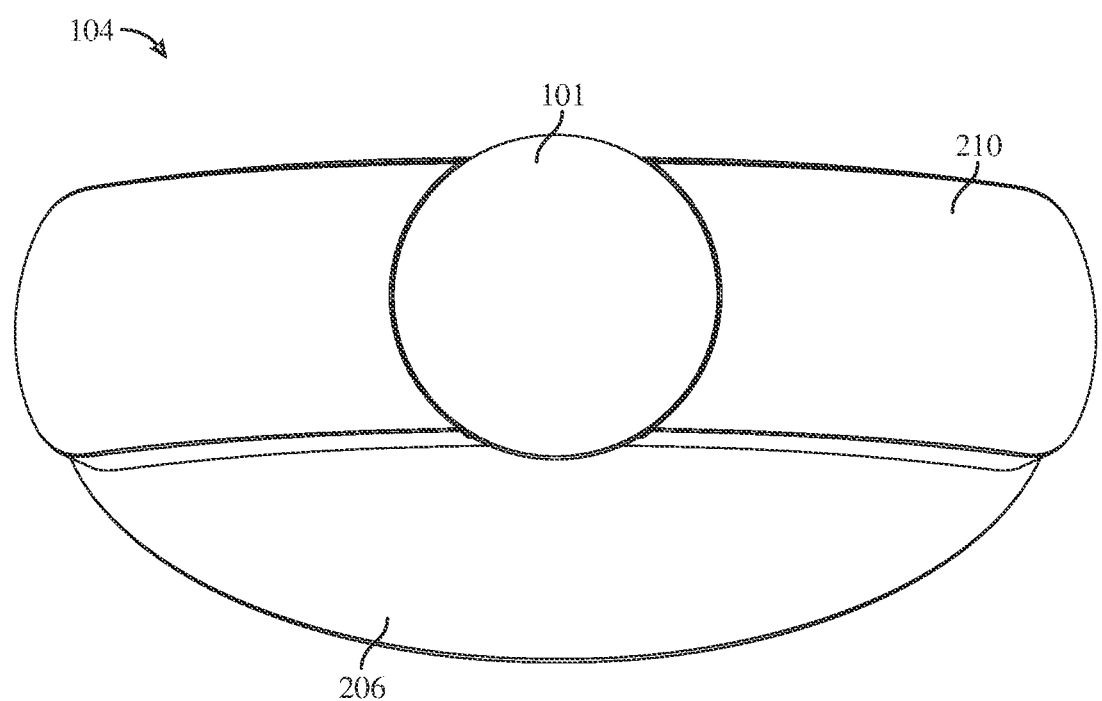
FIG. 10 is a rear view of the exemplary backpiece of FIG. 1, according to some embodiments.
Figure 11:
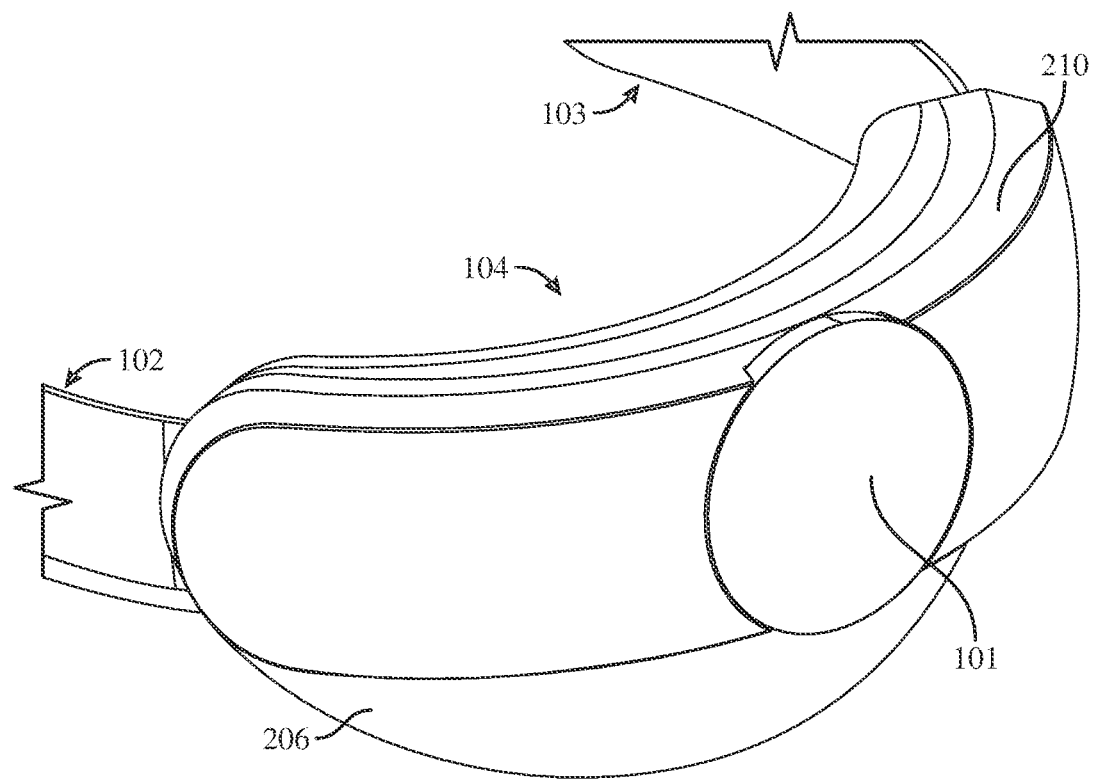
FIG. 11 is a perspective view of the exemplary backpiece of FIG. 1, according to some embodiments.

FIGS. 10 and 11 are a rear and perspective view of adjustable strap system 100, according to at least one embodiment of the present disclosure. As shown, adjustment knob 101 may be sized to extend above and below a top and bottom of battery housing 210. In some embodiments, adjustment knob 101 may be recessed into battery housing 210 such that a face of adjustment knob 101 and a face of battery housing 210 are flush with one another (e.g., as illustrated in FIG. 11).

Figure 12:
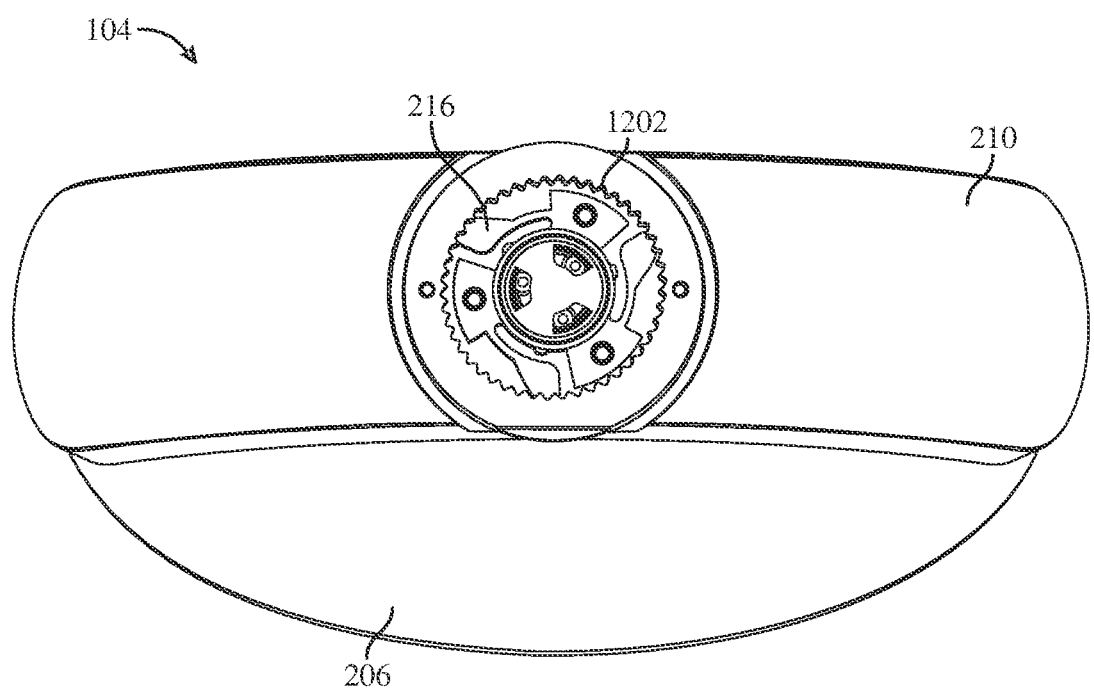
FIG. 12 is a cutaway view of exemplary components of the exemplary backpiece of FIG. 10, according to some embodiments.
Figure 13:
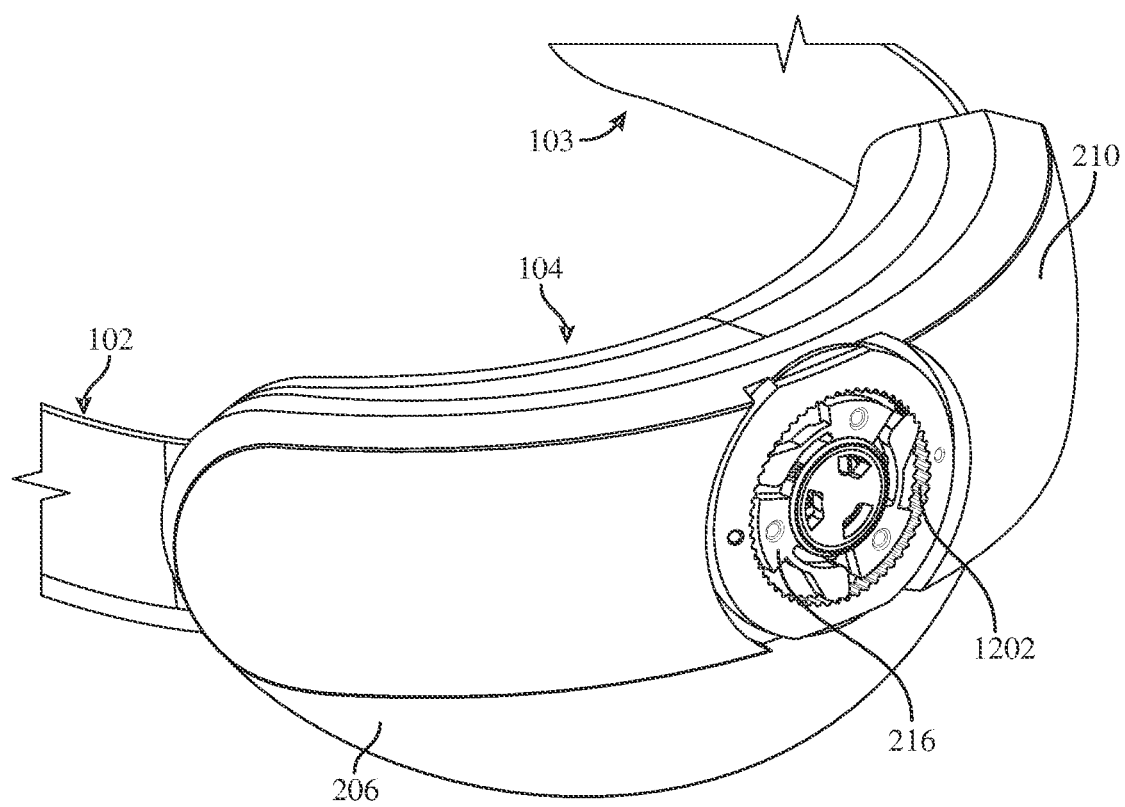
FIG. 13 is another cutaway view of exemplary components of the exemplary backpiece of FIG. 10, according to some embodiments.
Figure 14:
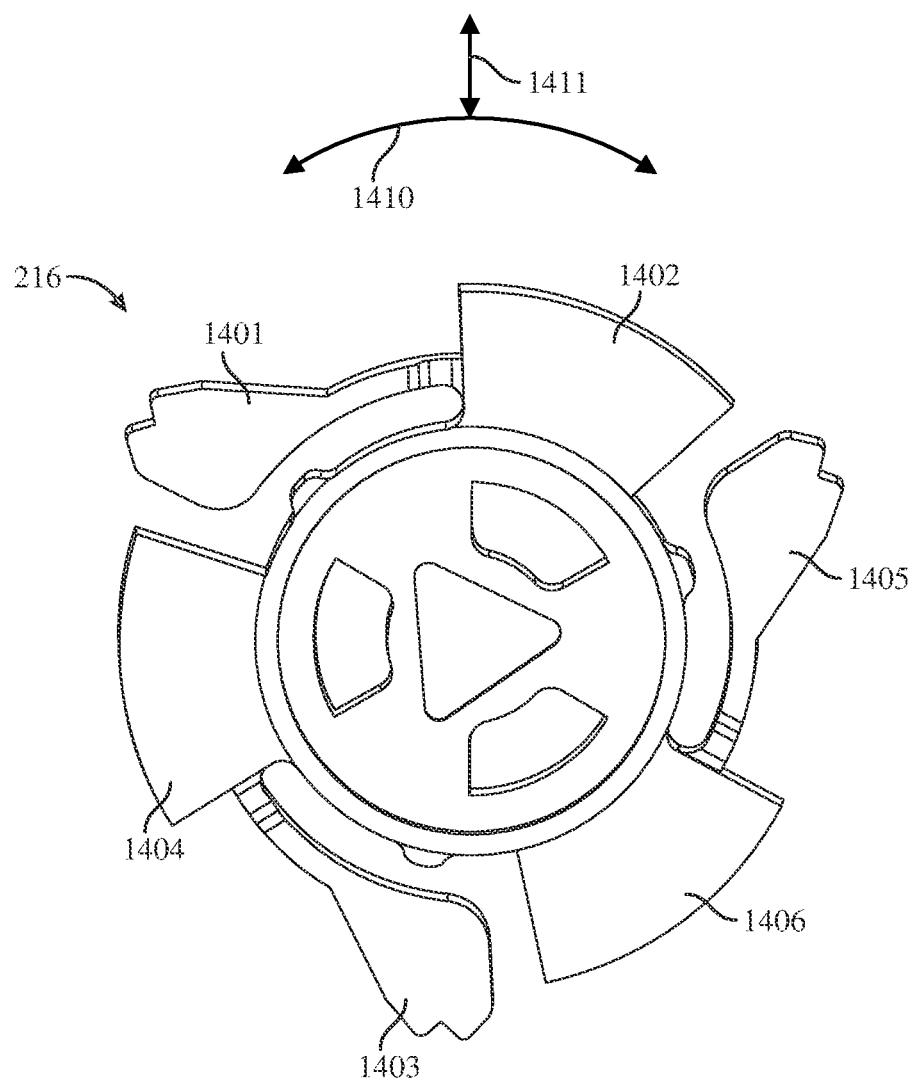
FIG. 14 is a rear view of an exemplary ratcheting component, according to some embodiments.
Figure 15:
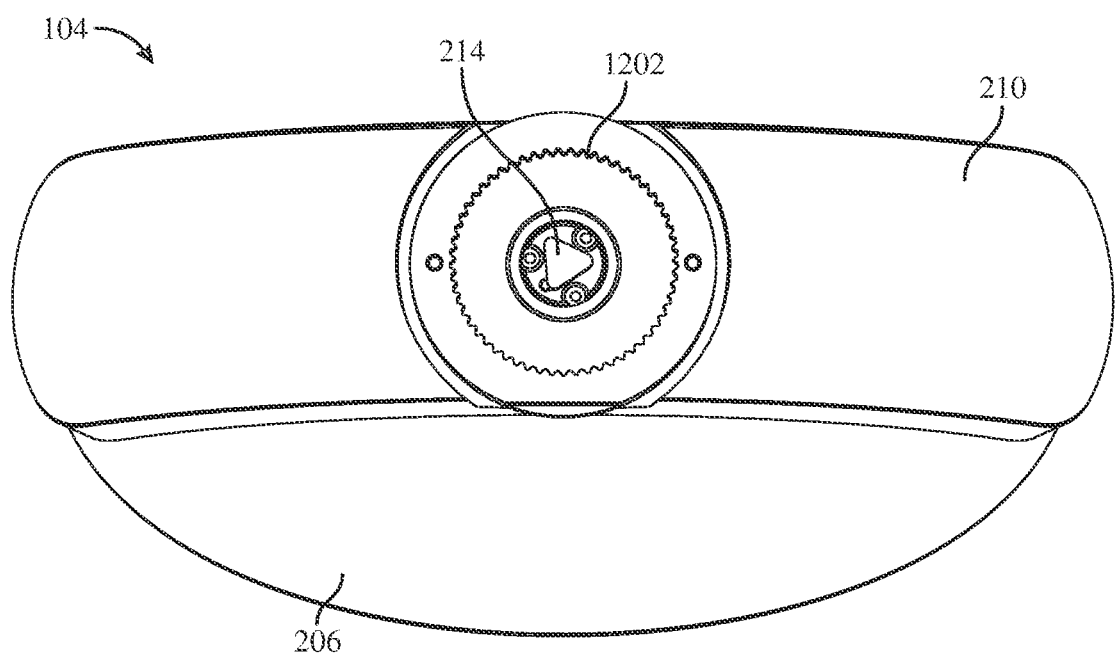
FIG. 15 is a cutaway view of exemplary components of the exemplary backpiece of FIG. 10, according to some embodiments.

FIGS. 12-18 are various cutaway views of adjustable strap system 100, according to at least one embodiment of the present disclosure. As shown in FIGS. 12 and 13, battery housing 210 may include a recessed internal gear 1202. Ratcheting element 216 may be shaped and configured to engage with (e.g., mesh with) gear teeth of internal gear 1202. As shown in FIG. 14, ratcheting element 216 may include one or more pawls (e.g., pawls 1401, 1403, and 1405) coupled to corresponding radial supports (e.g., radial supports 1402, 1404, and 1406). Each of pawls 1401, 1403, and 1405 may include teeth configured and positioned to engage with (e.g., mesh with) teeth of internal gear 1202.

Pawls 1401, 1403, and 1405 may be configured to substantially resist compression and tension in the directions indicated by an arrow 1410 and/or deform in the directions indicated by an arrow 1411. As ratcheting element 216 may be coupled to adjustment knob 101, ratcheting element 216 may rotate with movement of adjustment knob 101. If a user rotates adjustment knob 101 in a tightening direction (e.g., a clockwise direction when viewed from the rear of adjustable strap system 100 as shown in FIG. 12), ratcheting element 216 may likewise rotate in a clockwise direction. When this occurs, pawls 1401, 1403, and 1405 may bend radially inwards such that the teeth of pawls 1401, 1403, and 1405 slip past the teeth of internal gear 1202 until a new position of ratcheting element 216 relative to battery housing 210 is reached and the teeth of pawls 1401, 1403, and 1405 re-engage with the teeth of internal gear 1202 and resist motion in the opposite direction.

Figure 16:
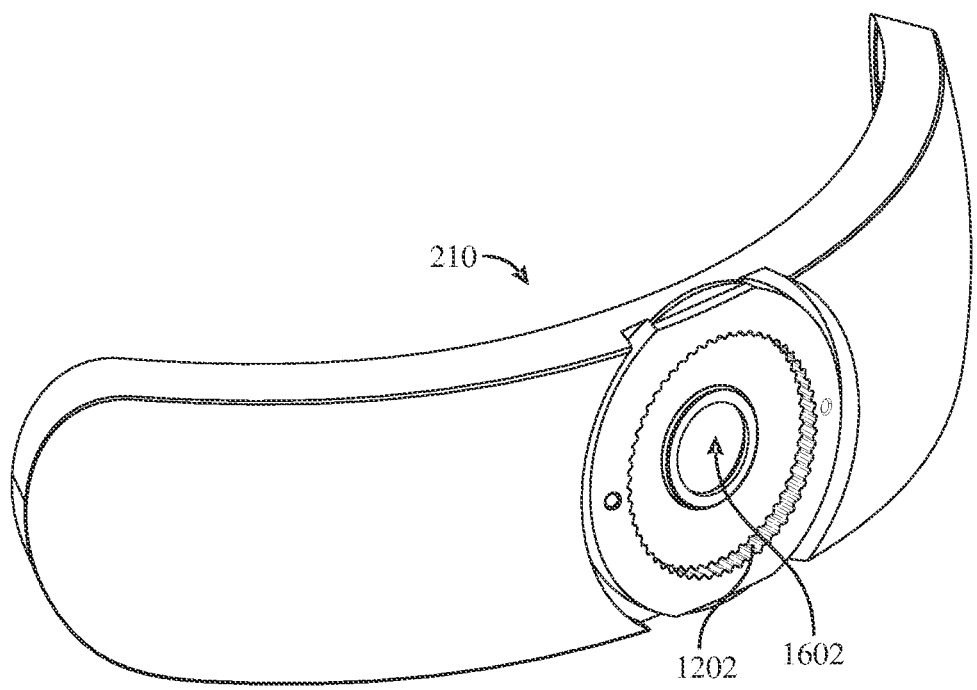
FIG. 16 is another cutaway view of exemplary components of the exemplary backpiece of FIG. 10, according to some embodiments.
Figure 17:
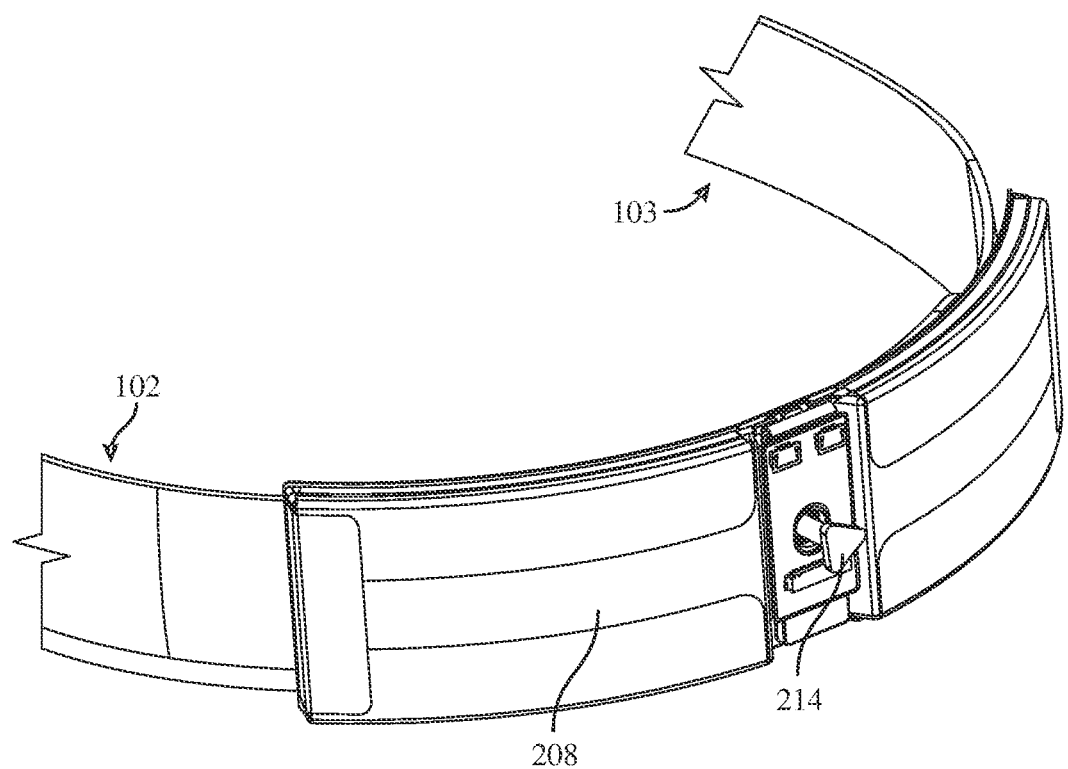
FIG. 17 is another cutaway view of exemplary components of the exemplary backpiece of FIG. 10, according to some embodiments.
Figure 18:
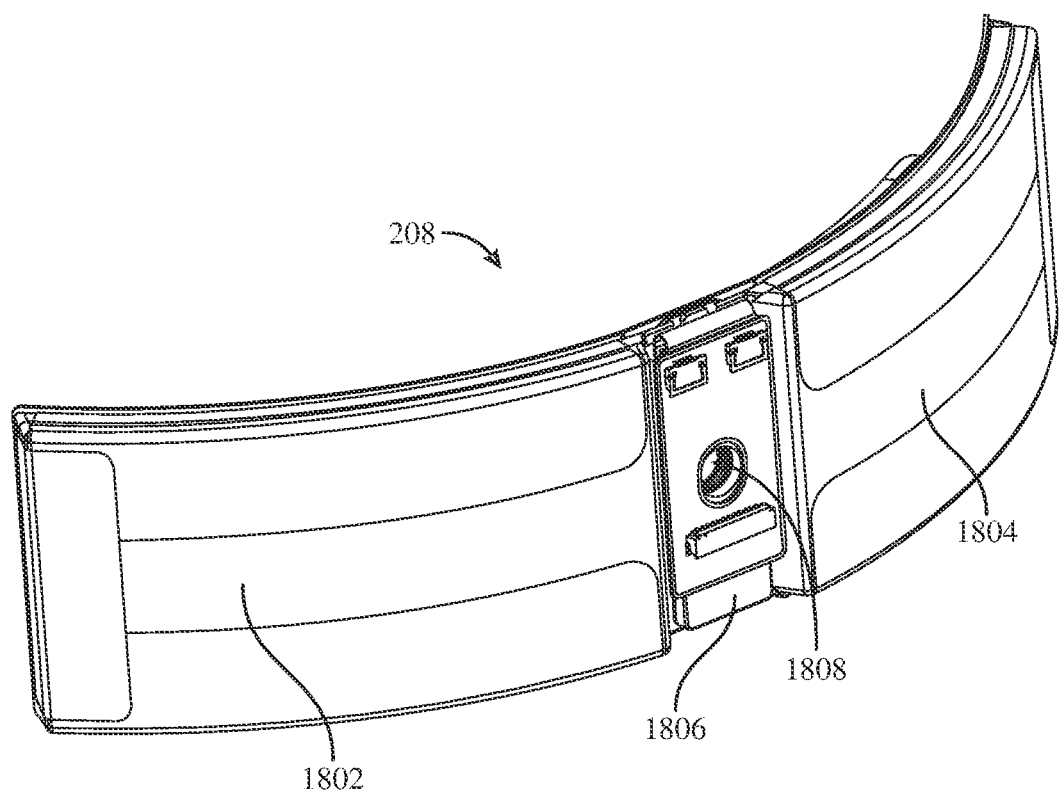
FIG. 18 is a perspective view of an exemplary battery assembly, according to some embodiments.
Figure 19:
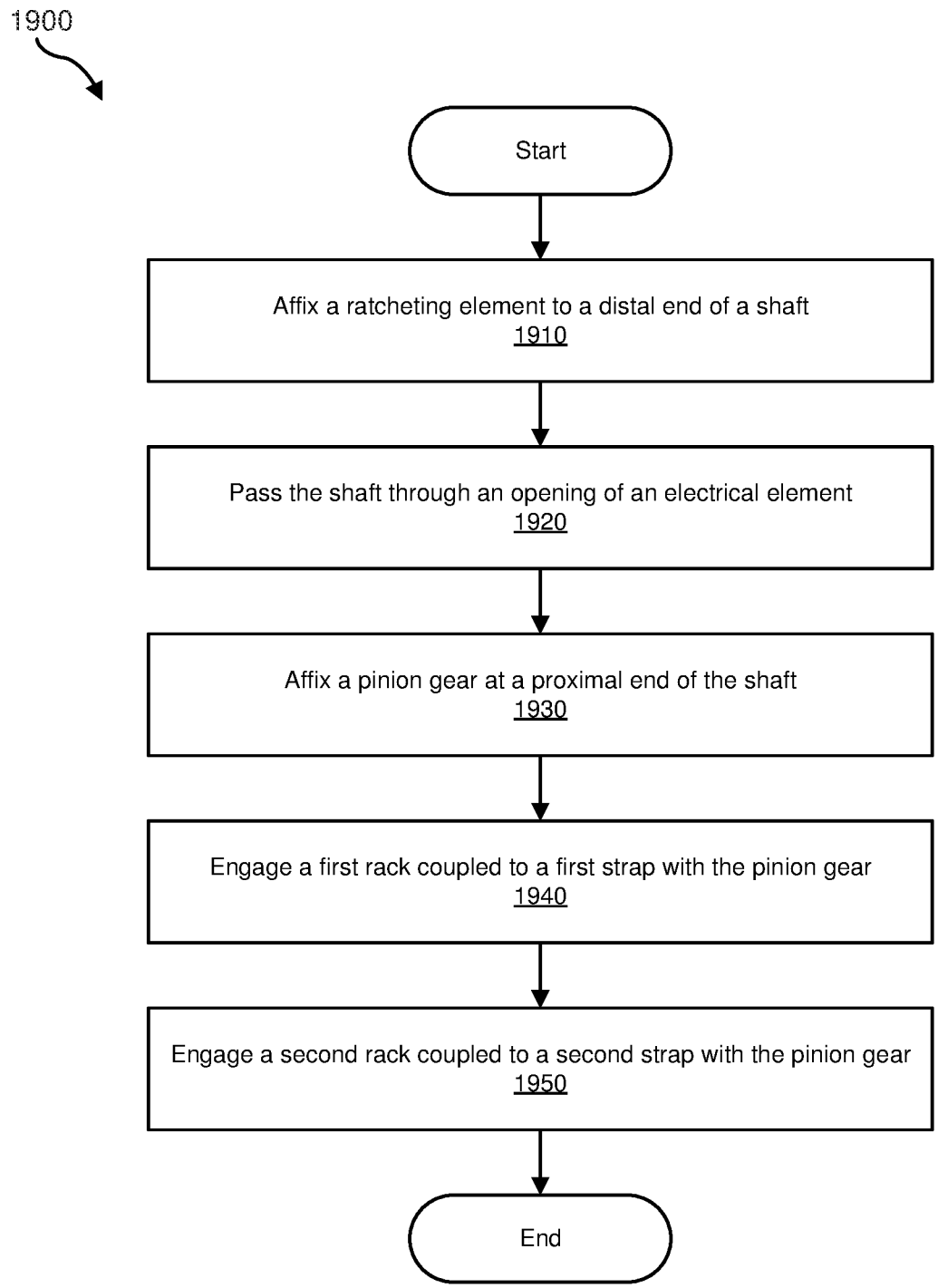
FIG. 19 is a flow diagram illustrating an example method of manufacturing an adjustable strap device, according to at least one embodiment of the present disclosure.

As shown in FIGS. 16-18, battery housing 210 and battery assembly 208 may include openings through which pass-through shaft 214 may run from ratcheting element 216 to pinion gear 204. For example, battery housing 210 may include a through hole 1602, and battery assembly 208 may include a through hole 1808. As shown in FIG. 18, battery assembly 208 may include a curved battery cell 1802 and a curved battery cell 1804 coupled to a battery-protection module 1806. In this example, battery-protection module 1806 may include through hole 1808.

FIG. 19 is a flow diagram illustrating an example method 1900 of manufacturing an adjustable strap device, according to at least one embodiment of the present disclosure. At operation 1910, a ratcheting element may be affixed to a distal end of a shaft. Operation 1910 may be performed in a variety of ways. For example, a ratcheting element coupled to an adjustment knob may be affixed to a distal end of a pass-through shaft.

At operation 1920, the shaft may be passed through an opening of an electrical element. Operation 1920 may be performed in a variety of ways. For example, a pass-through shaft may be positioned through an opening of a battery-pack assembly.

At operation 1930, a pinion gear may be affixed to a proximal end of the shaft. Operation 1930 may be performed in a variety of ways. For example, a pinion gear may be coupled, fastened, and/or affixed to the proximal end of a pass-through shaft.

At operation 1940, a first rack coupled to a first strap may be engaged with the pinion gear. Operation 1940 may be performed in a variety of ways. For example, the first rack may be meshed with gear teeth of the pinion gear along a bottom or top edge of the pinion gear.

At operation 1950, a second rack coupled to a second strap may be engaged with the pinion gear. Operation 1950 may be performed in a variety of ways. For example, the second rack may be meshed with the gear teeth of the pinion gear along a top or bottom edge of the pinion gear, opposite the first rack.

EXAMPLE EMBODIMENTS

Example 1: An adjustable strap apparatus may include (1) a left strap having a first rack member, (2) a right strap having a second rack member, (3) an electrical unit having an opening, (4) a shaft passing through the opening, (5) a pinion member affixed to a proximal end of the shaft and adapted to (a) engage the first rack member and the second rack member and (b) translate the first rack member and the second rack member in opposite directions via rotation of the shaft, and (6) a ratcheting member coupled to a distal end of the shaft and having one or more pawls adapted to prevent rotation of the shaft when engaged.

Example 2: The adjustable strap apparatus of Example 1, where the electrical unit may include a printed circuit board enclosing the opening.

Example 3: The adjustable strap apparatus of any of Examples 1-2, where the electrical unit may include a battery pack enclosing the opening.

Example 4: The adjustable strap apparatus of any of Examples 1-3, where the left strap and the right strap are coupled to a head-mounted display device and the battery pack provides power to the head-mounted display device.

Example 5: The adjustable strap apparatus of any of Examples 1-4, where the electrical unit may include a curved battery pack enclosing the opening.

Example 6: The adjustable strap apparatus of any of Examples 1-5, further including a housing containing the electrical unit, where the housing may include an internal gear adapted to engage the one or more pawls and the one or more pawls prevent rotation of the shaft when engaged with the internal gear of the housing.

Example 7: The adjustable strap apparatus of any of Examples 1-6, where the ratcheting member further includes one or more radial supports, each radial support being coupled to one of the one or more pawls and each of the one or more pawls is oriented tangential to an axis of rotation of the shaft.

Example 8: The adjustable strap apparatus of any of Examples 1-7, where the one or more radial supports and the one of the one or more pawls are formed from a single semi-rigid part and each of the one or more pawls is shaped to substantially resist a compressive force and deform in response to a bending force.

Example 9: The adjustable strap apparatus of any of Examples 1-8, where (1) the left strap includes a first elongate opening, (2) the first rack member forms an inner surface of the first elongate opening, (3) the right strap includes a second elongate opening, and (4) the second rack member forms an inner surface of the second elongate opening.

Example 10: The adjustable strap apparatus of any of Examples 1-9, where (1) the left strap includes a first elongate opening, (2) the first rack member forms an upper inside surface of the first elongate opening, (3) the right strap includes a second elongate opening, and (4) the second rack member forms a lower inside surface of the second elongate opening.

Example 11: The adjustable strap apparatus of any of Examples 1-10, where (1) the left strap includes a first elongate opening, (2) the first rack member forms a lower inside surface of the first elongate opening, (3) the right strap includes a second elongate opening, and (4) the second rack member forms an upper surface of the second elongate opening.

Example 12: A head-mounted-display device may include (1) a display unit, (2) a front housing containing the display unit, (3) a left strap coupled to the front housing, the left strap having a first rack member, (4) a right strap coupled to the front housing, the right strap having a second rack member, (5) an electrical unit having an opening, (6) a shaft passing through the opening, (7) a pinion member affixed to a proximal end of the shaft, the pinion member being adapted to (a) engage the first rack member and the second rack member and (b) translate the first rack member and the second rack member in opposite directions via rotation of the shaft, and (8) a ratcheting member coupled to a distal end of the shaft and having one or more pawls adapted to prevent rotation of the shaft when engaged.

Example 13: The head-mounted-display device of Example 12, where the electrical unit may include a printed circuit board enclosing the opening.

Example 14: The head-mounted-display device of any of Examples 12-13, where the electrical unit may include a battery pack enclosing the opening.

Example 15: The head-mounted-display device of any of Examples 12-14, where the battery pack provides power to the display unit.

Example 16: The head-mounted-display device of any of Examples 12-15, where the electrical unit may include a curved battery pack.

Example 17: The head-mounted-display device of any of Examples 12-16, further including a rear housing containing the electrical unit, where the rear housing may include an internal gear adapted to engage the one or more pawls and the one or more pawls prevent rotation of the shaft when engaged with the internal gear of the rear housing.

Example 18: An adjustable strap apparatus may include (1) a housing shaped to conform to a user's head, (2) a left strap, (3) a right strap, (4) an electrical unit having an opening, (5) a shaft passing through the opening, (6) a translation member affixed to a proximal end of the shaft, the translation member being adapted to (a) engage the left strap and the right strap and (b) translate the first strap and the second strap in opposite directions via rotation of the shaft, and (7) a retaining member coupled to a distal end of the shaft. The retaining member may be adapted to prevent rotation of the shaft in at least one direction when engaged with the housing.

Example 19: The adjustable strap apparatus of Example 18, where (1) the left strap may include a first gear rack, (2) the right strap may include a second gear rack, and (3) the translation member may include one or more pinion gears adapted to (a) engage the first gear rack and the second gear rack and (b) translate the first strap and the second strap in opposite directions via rotation of the shaft.

Example 20: The adjustable strap apparatus of any of Examples 18-19, where the electrical unit may include a battery pack enclosing the opening and the retaining member a ratcheting member.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 2000 in FIG. 20. Other artificial-reality systems may include an NED that also provides visibility into the real world (e.g., augmented-reality system 2100 in FIG. 21) or that visually immerses a user in an artificial reality (e.g., virtual-reality system 2200 in FIG. 22). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 20:
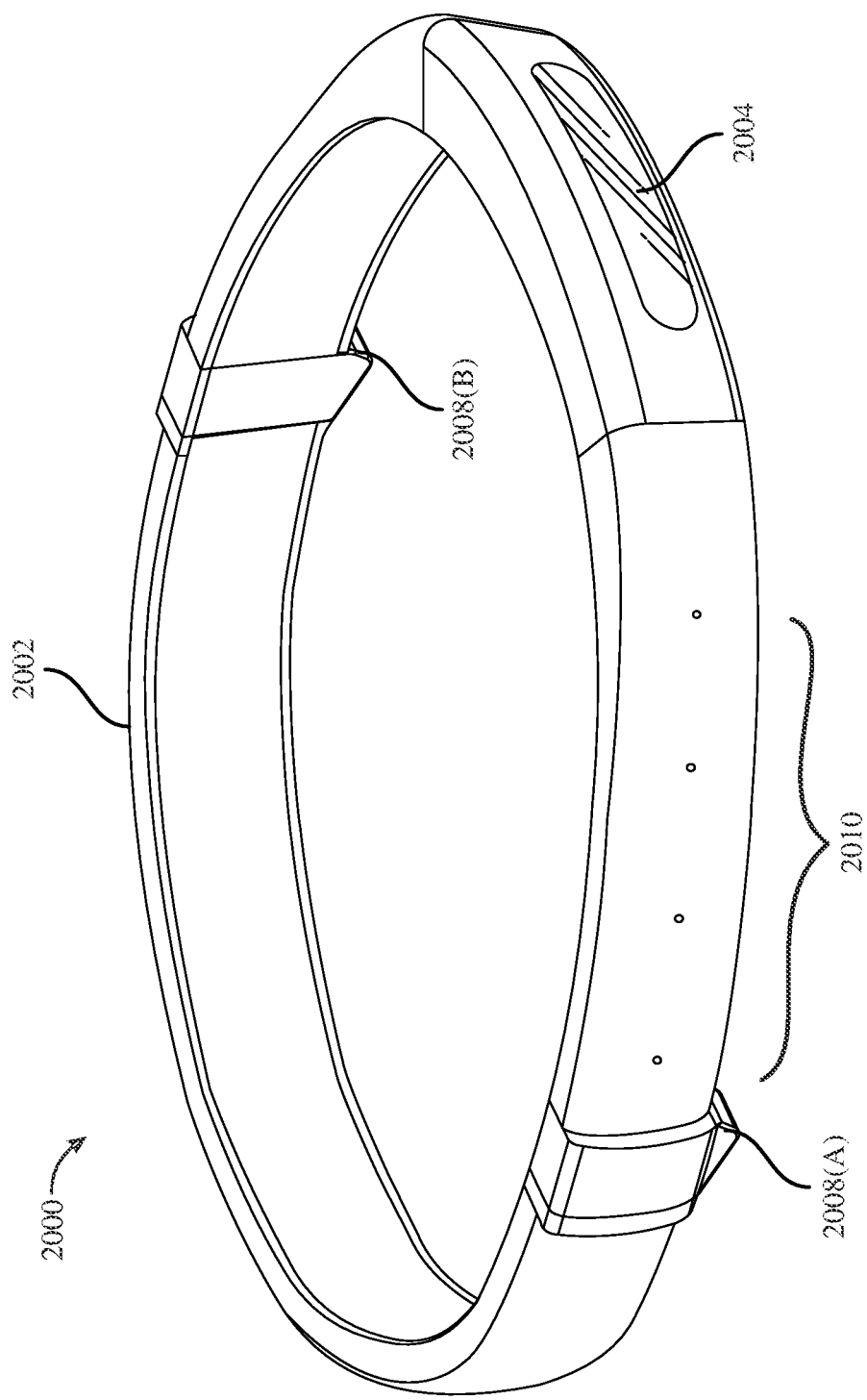
FIG. 20 is an illustration of an exemplary artificial-reality headband that may be used in connection with embodiments of this disclosure.

Turning to FIG. 20, augmented-reality system 2000 generally represents a wearable device dimensioned to fit about a body part (e.g., a head) of a user. As shown in FIG. 20, system 2000 may include a frame 2002 and a camera assembly 2004 that is coupled to frame 2002 and configured to gather information about a local environment by observing the local environment. Augmented-reality system 2000 may also include one or more audio devices, such as output audio transducers 2008(A) and 2008(B) and input audio transducers 2010. Output audio transducers 2008(A) and 2008(B) may provide audio feedback and/or content to a user, and input audio transducers 2010 may capture audio in a user's environment.

As shown, augmented-reality system 2000 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 2000 may not include an NED, augmented-reality system 2000 may include other types of screens or visual feedback devices (e.g., a display screen integrated into a side of frame 2002).

Figure 21:
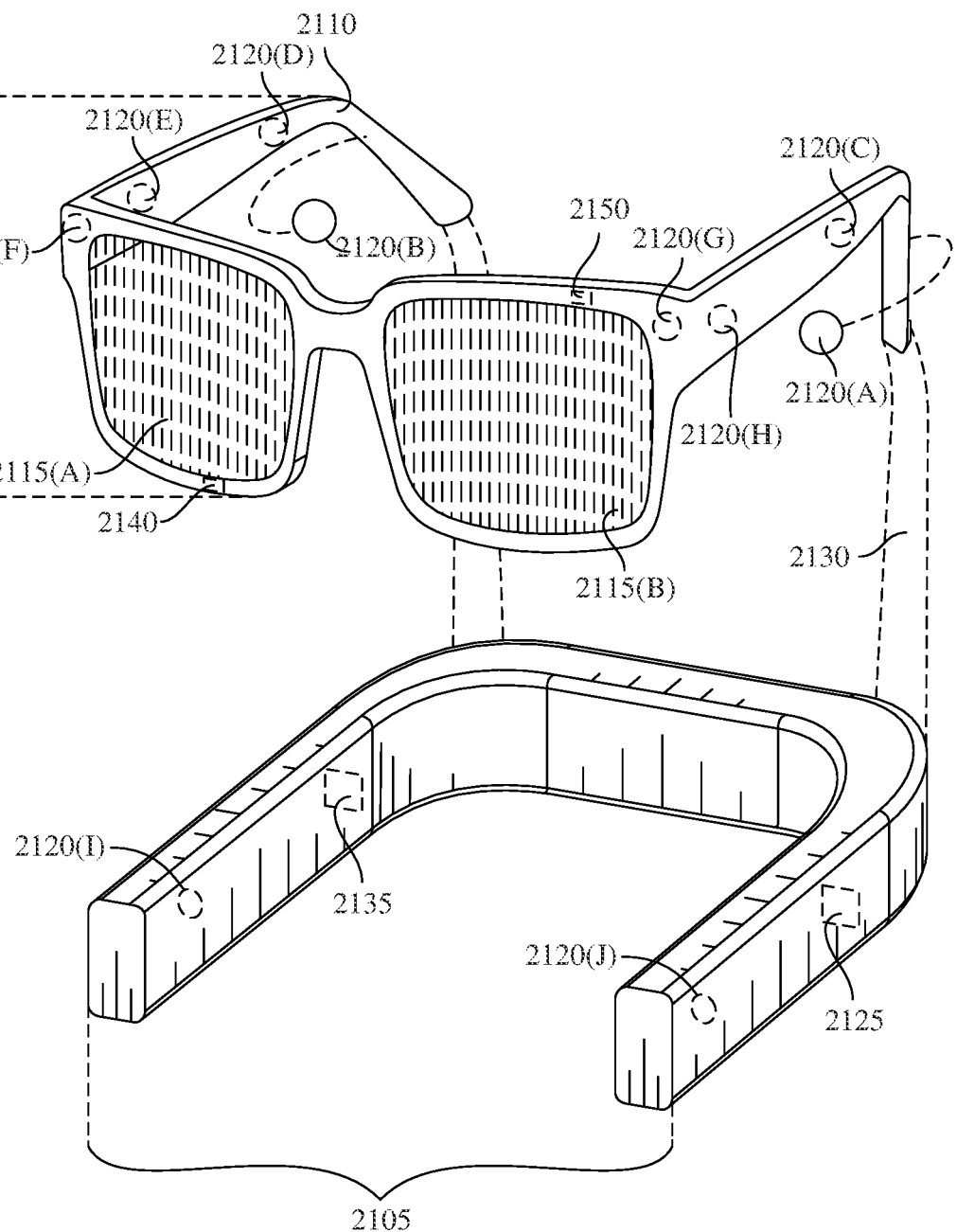
FIG. 21 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 21, augmented-reality system 2100 may include an eyewear device 2102 with a frame 2110 configured to hold a left display device 2115(A) and a right display device 2115(B) in front of a user's eyes. Display devices 2115(A) and 2115(B) may act together or independently to present an image or series of images to a user. While augmented-reality system 2100 includes two displays, embodiments of this disclosure may be implemented in augmented-reality systems with a single NED or more than two NEDs.

In some embodiments, augmented-reality system 2100 may include one or more sensors, such as sensor 2140. Sensor 2140 may generate measurement signals in response to motion of augmented-reality system 2100 and may be located on substantially any portion of frame 2110. Sensor 2140 may represent a position sensor, an inertial measurement unit (IMU), a depth camera assembly, or any combination thereof. In some embodiments, augmented-reality system 2100 may or may not include sensor 2140 or may include more than one sensor. In embodiments in which sensor 2140 includes an IMU, the IMU may generate calibration data based on measurement signals from sensor 2140. Examples of sensor 2140 may include, without limitation, accelerometers, gyroscopes, magnetometers, other suitable types of sensors that detect motion, sensors used for error correction of the IMU, or some combination thereof.

Augmented-reality system 2100 may also include a microphone array with a plurality of acoustic transducers 2120(A)-2120(J), referred to collectively as acoustic transducers 2120. Acoustic transducers 2120 may be transducers that detect air pressure variations induced by sound waves. Each acoustic transducer 2120 may be configured to detect sound and convert the detected sound into an electronic format (e.g., an analog or digital format). The microphone array in FIG. 2 may include, for example, ten acoustic transducers: 2120(A) and 2120(B), which may be designed to be placed inside a corresponding ear of the user, acoustic transducers 2120(C), 2120(D), 2120(E), 2120(F), 2120(G), and 2120(H), which may be positioned at various locations on frame 2110, and/or acoustic transducers 2120(I) and 2120(J), which may be positioned on a corresponding neckband 2105.

In some embodiments, one or more of acoustic transducers 2120(A)-(F) may be used as output transducers (e.g., speakers). For example, acoustic transducers 2120(A) and/or 2120(B) may be earbuds or any other suitable type of headphone or speaker.

The configuration of acoustic transducers 2120 of the microphone array may vary. While augmented-reality system 2100 is shown in FIG. 21 as having ten acoustic transducers 2120, the number of acoustic transducers 2120 may be greater or less than ten. In some embodiments, using higher numbers of acoustic transducers 2120 may increase the amount of audio information collected and/or the sensitivity and accuracy of the audio information. In contrast, using a lower number of acoustic transducers 2120 may decrease the computing power required by an associated controller 2150 to process the collected audio information. In addition, the position of each acoustic transducer 2120 of the microphone array may vary. For example, the position of an acoustic transducer 2120 may include a defined position on the user, a defined coordinate on frame 2110, an orientation associated with each acoustic transducer 2120, or some combination thereof.

Acoustic transducers 2120(A) and 2120(B) may be positioned on different parts of the user's ear, such as behind the pinna or within the auricle or fossa. Or, there may be additional acoustic transducers 2120 on or surrounding the ear in addition to acoustic transducers 2120 inside the ear canal. Having an acoustic transducer 2120 positioned next to an ear canal of a user may enable the microphone array to collect information on how sounds arrive at the ear canal. By positioning at least two of acoustic transducers 2120 on either side of a user's head (e.g., as binaural microphones), augmented-reality device 2100 may simulate binaural hearing and capture a 3D stereo sound field around about a user's head. In some embodiments, acoustic transducers 2120(A) and 2120(B) may be connected to augmented-reality system 2100 via a wired connection 2130, and in other embodiments, acoustic transducers 2120(A) and 2120(B) may be connected to augmented-reality system 2100 via a wireless connection (e.g., a Bluetooth connection). In still other embodiments, acoustic transducers 2120(A) and 2120(B) may not be used at all in conjunction with augmented-reality system 2100.

Acoustic transducers 2120 on frame 2110 may be positioned along the length of the temples, across the bridge, above or below display devices 2115(A) and 2115(B), or some combination thereof. Acoustic transducers 2120 may be oriented such that the microphone array is able to detect sounds in a wide range of directions surrounding the user wearing the augmented-reality system 2100. In some embodiments, an optimization process may be performed during manufacturing of augmented-reality system 2100 to determine relative positioning of each acoustic transducer 2120 in the microphone array.

In some examples, augmented-reality system 2100 may include or be connected to an external device (e.g., a paired device), such as neckband 2105. Neckband 2105 generally represents any type or form of paired device. Thus, the following discussion of neckband 2105 may also apply to various other paired devices, such as charging cases, smart watches, smart phones, wrist bands, other wearable devices, hand-held controllers, tablet computers, laptop computers and other external compute devices, etc.

As shown, neckband 2105 may be coupled to eyewear device 2102 via one or more connectors. The connectors may be wired or wireless and may include electrical and/or non-electrical (e.g., structural) components. In some cases, eyewear device 2102 and neckband 2105 may operate independently without any wired or wireless connection between them. While FIG. 21 illustrates the components of eyewear device 2102 and neckband 2105 in example locations on eyewear device 2102 and neckband 2105, the components may be located elsewhere and/or distributed differently on eyewear device 2102 and/or neckband 2105. In some embodiments, the components of eyewear device 2102 and neckband 2105 may be located on one or more additional peripheral devices paired with eyewear device 2102, neckband 2105, or some combination thereof.

Pairing external devices, such as neckband 2105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 2100 may be provided by a paired device or shared between a paired device and an eyewear device, thus reducing the weight, heat profile, and form factor of the eyewear device overall while still retaining desired functionality. For example, neckband 2105 may allow components that would otherwise be included on an eyewear device to be included in neckband 2105 since users may tolerate a heavier weight load on their shoulders than they would tolerate on their heads. Neckband 2105 may also have a larger surface area over which to diffuse and disperse heat to the ambient environment. Thus, neckband 2105 may allow for greater battery and computation capacity than might otherwise have been possible on a stand-alone eyewear device. Since weight carried in neckband 2105 may be less invasive to a user than weight carried in eyewear device 2102, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 2105 may be communicatively coupled with eyewear device 2102 and/or to other devices. These other devices may provide certain functions (e.g., tracking, localizing, depth mapping, processing, storage, etc.) to augmented-reality system 2100. In the embodiment of FIG. 21, neckband 2105 may include two acoustic transducers (e.g., 2120(I) and 2120(J)) that are part of the microphone array (or potentially form their own microphone subarray). Neckband 2105 may also include a controller 2125 and a power source 2135.

Acoustic transducers 2120(I) and 2120(J) of neckband 2105 may be configured to detect sound and convert the detected sound into an electronic format (analog or digital). In the embodiment of FIG. 21, acoustic transducers 2120(I) and 2120(J) may be positioned on neckband 2105, thereby increasing the distance between the neckband acoustic transducers 2120(I) and 2120(J) and other acoustic transducers 2120 positioned on eyewear device 2102. In some cases, increasing the distance between acoustic transducers 2120 of the microphone array may improve the accuracy of beamforming performed via the microphone array. For example, if a sound is detected by acoustic transducers 2120(C) and 2120(D) and the distance between acoustic transducers 2120(C) and 2120(D) is greater than, e.g., the distance between acoustic transducers 2120(D) and 2120(E), the determined source location of the detected sound may be more accurate than if the sound had been detected by acoustic transducers 2120(D) and 2120(E).

Controller 2125 of neckband 2105 may process information generated by the sensors on neckband 2105 and/or augmented-reality system 2100. For example, controller 2125 may process information from the microphone array that describes sounds detected by the microphone array. For each detected sound, controller 2125 may perform a direction-of-arrival (DOA) estimation to estimate a direction from which the detected sound arrived at the microphone array. As the microphone array detects sounds, controller 2125 may populate an audio data set with the information. In embodiments in which augmented-reality system 2100 includes an inertial measurement unit, controller 2125 may compute all inertial and spatial calculations from the IMU located on eyewear device 2102. A connector may convey information between augmented-reality system 2100 and neckband 2105 and between augmented-reality system 2100 and controller 2125. The information may be in the form of optical data, electrical data, wireless data, or any other transmittable data form. Moving the processing of information generated by augmented-reality system 2100 to neckband 2105 may reduce weight and heat in eyewear device 2102, making it more comfortable to the user.

Power source 2135 in neckband 2105 may provide power to eyewear device 2102 and/or to neckband 2105. Power source 2135 may include, without limitation, lithium-ion batteries, lithium-polymer batteries, primary lithium batteries, alkaline batteries, or any other form of power storage. In some cases, power source 2135 may be a wired power source. Including power source 2135 on neckband 2105 instead of on eyewear device 2102 may help better distribute the weight and heat generated by power source 2135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 2200 in FIG. 22, that mostly or completely covers a user's field of view. Virtual-reality system 2200 may include a front rigid body 2202 and a band 2204 shaped to fit around a user's head. Virtual-reality system 2200 may also include output audio transducers 2206(A) and 2206(B). Furthermore, while not shown in FIG. 22, front rigid body 2202 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 2100 and/or virtual-reality system 2200 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 2100 and/or virtual-reality system 2200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 2000, augmented-reality system 2100, and/or virtual-reality system 2200 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 20 and 22, output audio transducers 2008 (A), 2008(B), 2206(A), and 2206(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 2010 may include condenser microphones, dynamic microphones, ribbon microphones, and/or any other type or form of input transducer. In some embodiments, a single transducer may be used for both audio input and audio output.

Figure 22:
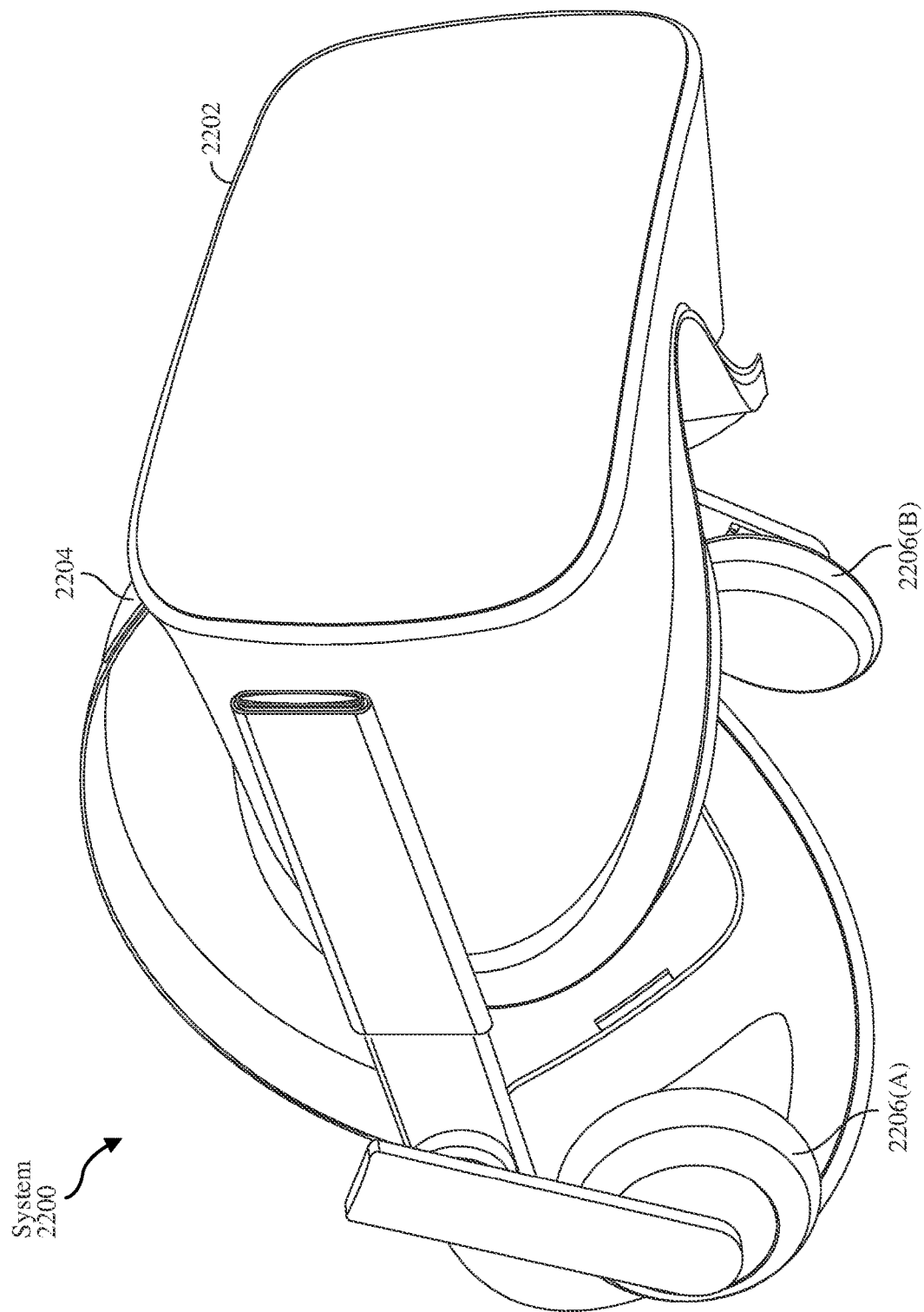
FIG. 22 is an illustration of an exemplary virtual-reality headset that may be used in connection with embodiments of this disclosure.

While not shown in FIGS. 20-22, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, artificial-reality systems 2000, 2100, and 2200 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 23:
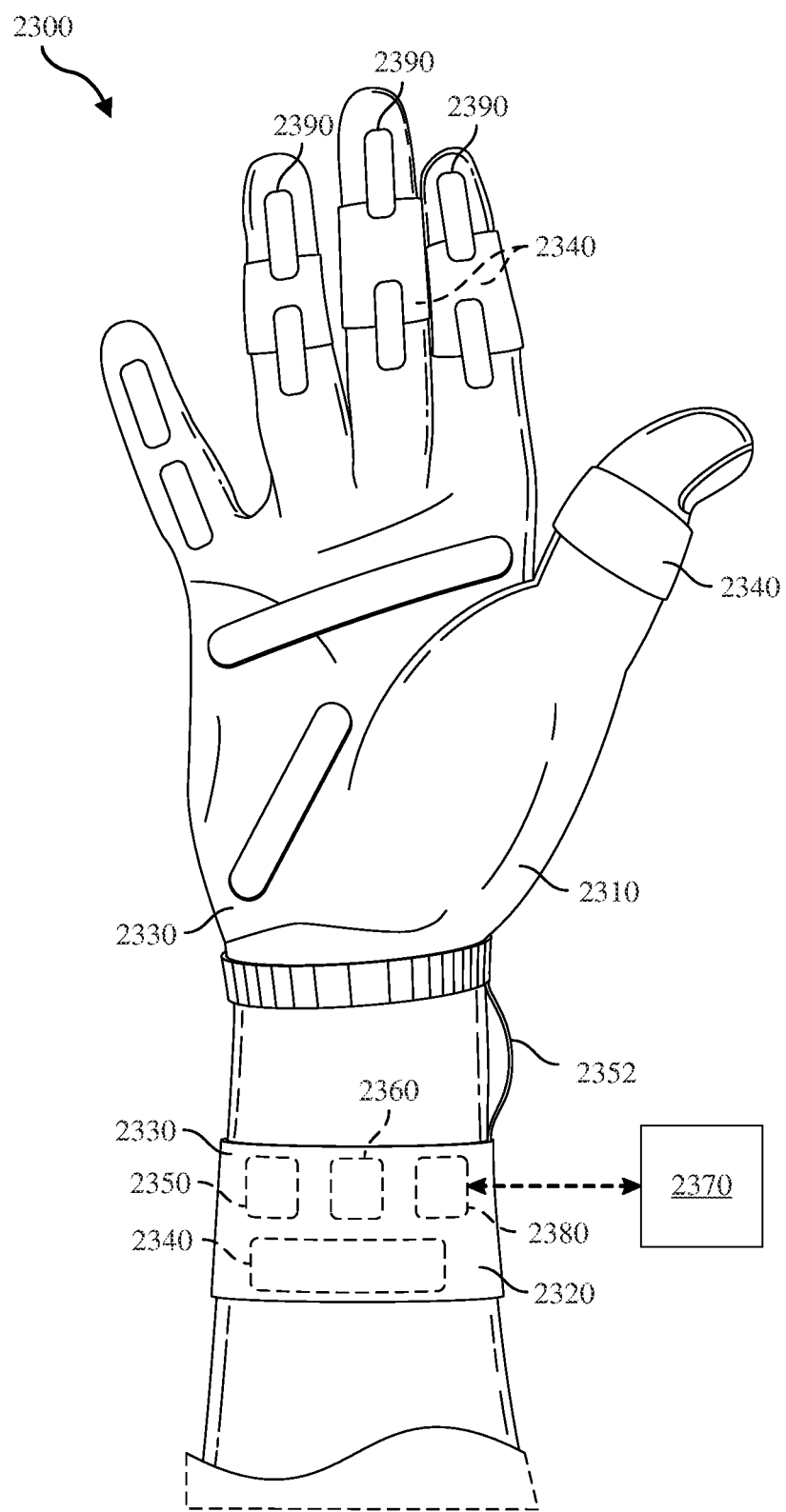
FIG. 23 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 23 illustrates a vibrotactile system 2300 in the form of a wearable glove (haptic device 2310) and wristband (haptic device 2320). Haptic device 2310 and haptic device 2320 are shown as examples of wearable devices that include a flexible, wearable textile material 2330 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 2340 may be positioned at least partially within one or more corresponding pockets formed in textile material 2330 of vibrotactile system 2300. Vibrotactile devices 2340 may be positioned in locations to provide a vibrating sensation (e.g., haptic feedback) to a user of vibrotactile system 2300. For example, vibrotactile devices 2340 may be positioned against the user's finger(s), thumb, or wrist, as shown in FIG. 23. Vibrotactile devices 2340 may, in some examples, be sufficiently flexible to conform to or bend with the user's corresponding body part(s).

A power source 2350 (e.g., a battery) for applying a voltage to the vibrotactile devices 2340 for activation thereof may be electrically coupled to vibrotactile devices 2340, such as via conductive wiring 2352. In some examples, each of vibrotactile devices 2340 may be independently electrically coupled to power source 2350 for individual activation. In some embodiments, a processor 2360 may be operatively coupled to power source 2350 and configured (e.g., programmed) to control activation of vibrotactile devices 2340.

Vibrotactile system 2300 may be implemented in a variety of ways. In some examples, vibrotactile system 2300 may be a standalone system with integral subsystems and components for operation independent of other devices and systems. As another example, vibrotactile system 2300 may be configured for interaction with another device or system 2370. For example, vibrotactile system 2300 may, in some examples, include a communications interface 2380 for receiving and/or sending signals to the other device or system 2370. The other device or system 2370 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 2380 may enable communications between vibrotactile system 2300 and the other device or system 2370 via a wireless (e.g., Wi-Fi, Bluetooth, cellular, radio, etc.) link or a wired link. If present, communications interface 2380 may be in communication with processor 2360, such as to provide a signal to processor 2360 to activate or deactivate one or more of the vibrotactile devices 2340.

Vibrotactile system 2300 may optionally include other subsystems and components, such as touch-sensitive pads 2390, pressure sensors, motion sensors, position sensors, lighting elements, and/or user interface elements (e.g., an on/off button, a vibration control element, etc.). During use, vibrotactile devices 2340 may be configured to be activated for a variety of different reasons, such as in response to the user's interaction with user interface elements, a signal from the motion or position sensors, a signal from the touch-sensitive pads 2390, a signal from the pressure sensors, a signal from the other device or system 2370, etc.

Although power source 2350, processor 2360, and communications interface 2380 are illustrated in FIG. 23 as being positioned in haptic device 2320, the present disclosure is not so limited. For example, one or more of power source 2350, processor 2360, or communications interface 2380 may be positioned within haptic device 2310 or within another wearable textile.

Figure 24:
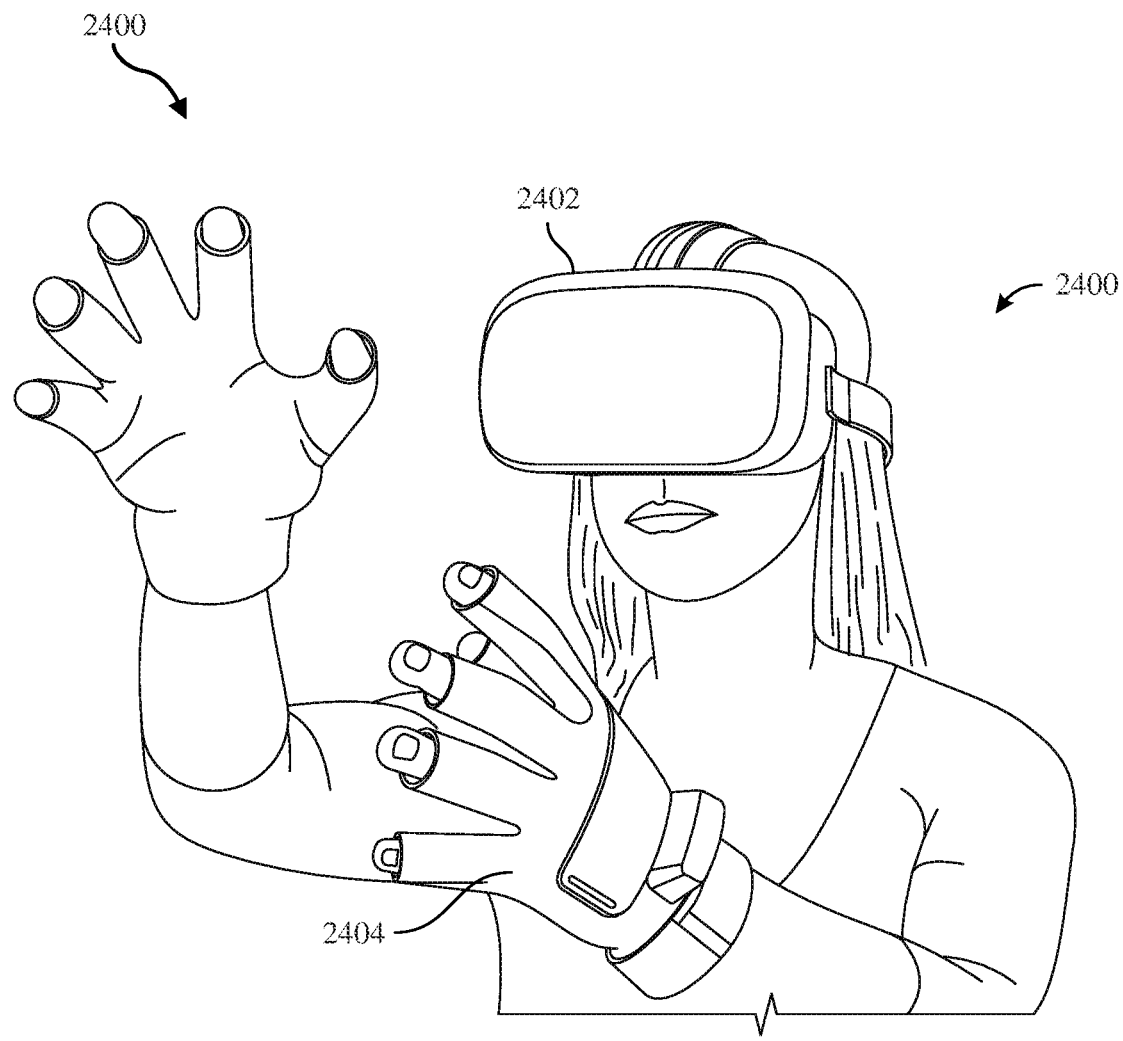
FIG. 24 is an illustration of an exemplary virtual-reality environment according to embodiments of this disclosure.

Haptic wearables, such as those shown in and described in connection with FIG. 23, may be implemented in a variety of types of artificial-reality systems and environments. FIG. 24 shows an example artificial-reality environment 2400 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 2402 generally represents any type or form of virtual-reality system, such as virtual-reality system 2200 in FIG. 22. Haptic device 2404 generally represents any type or form of wearable device, worn by a user of an artificial-reality system, that provides haptic feedback to the user to give the user the perception that he or she is physically engaging with a virtual object. In some embodiments, haptic device 2404 may provide haptic feedback by applying vibration, motion, and/or force to the user. For example, haptic device 2404 may limit or augment a user's movement. To give a specific example, haptic device 2404 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 2404 to send action requests to a console. Examples of action requests include, without limitation, requests to start an application and/or end the application and/or requests to perform a particular action within the application.

Figure 25:
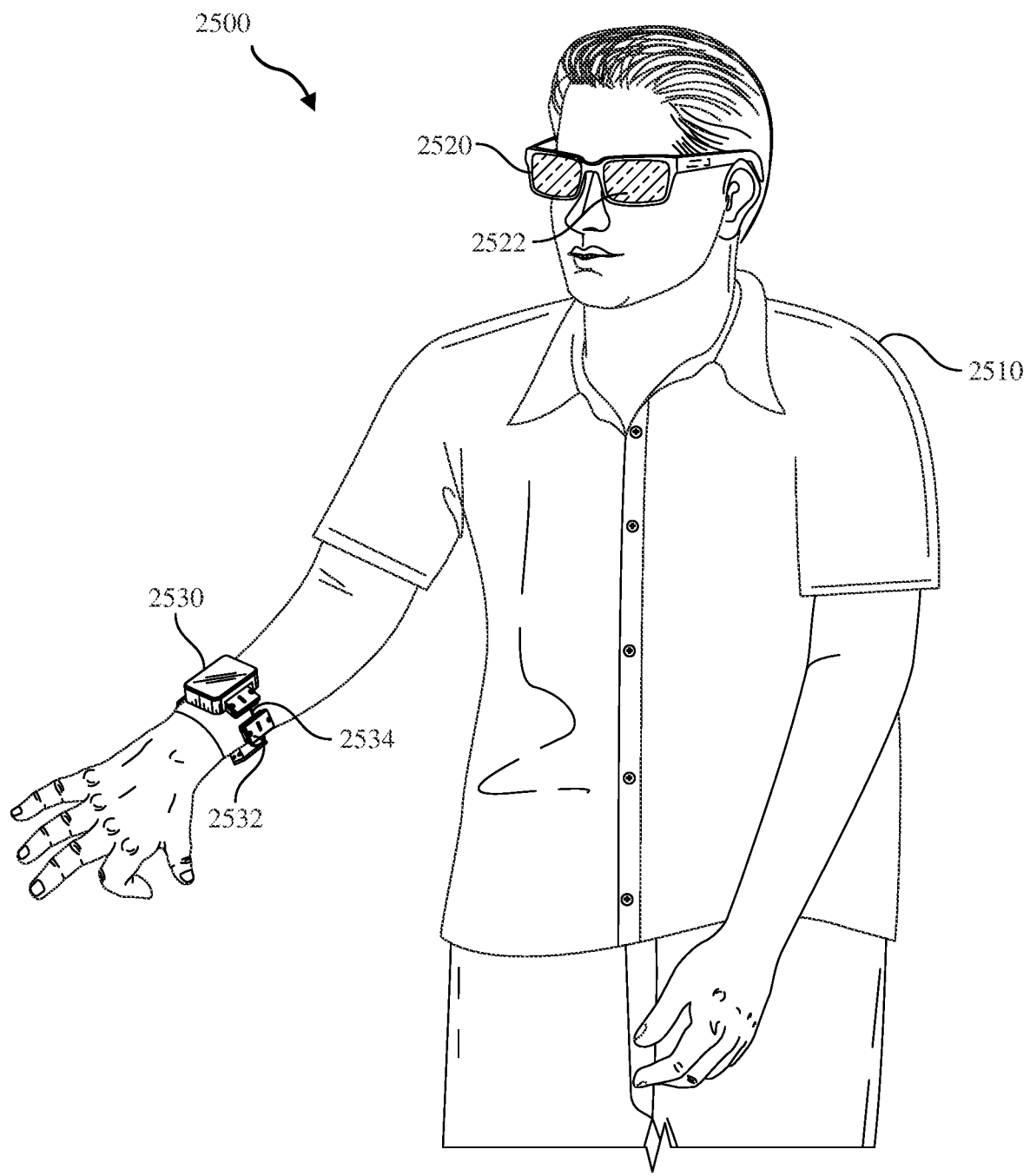
FIG. 25 is an illustration of an exemplary augmented-reality environment according to embodiments of this disclosure.

While haptic interfaces may be used with virtual-reality systems, as shown in FIG. 24, haptic interfaces may also be used with augmented-reality systems, as shown in FIG. 25. FIG. 25 is a perspective view of a user 2510 interacting with an augmented-reality system 2500. In this example, user 2510 may wear a pair of augmented-reality glasses 2520 that may have one or more displays 2522 and that are paired with a haptic device 2530. In this example, haptic device 2530 may be a wristband that includes a plurality of band elements 2532 and a tensioning mechanism 2534 that connects band elements 2532 to one another.

One or more of band elements 2532 may include any type or form of actuator suitable for providing haptic feedback. For example, one or more of band elements 2532 may be configured to provide one or more of various types of cutaneous feedback, including vibration, force, traction, texture, and/or temperature. To provide such feedback, band elements 2532 may include one or more of various types of actuators. In one example, each of band elements 2532 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 2310, 2320, 2404, and 2530 may include any suitable number and/or type of haptic transducer, sensor, and/or feedback mechanism. For example, haptic devices 2310, 2320, 2404, and 2530 may include one or more mechanical transducers, piezoelectric transducers, and/or fluidic transducers. Haptic devices 2310, 2320, 2404, and 2530 may also include various combinations of different types and forms of transducers that work together or independently to enhance a user's artificial-reality experience. In one example, each of band elements 2532 of haptic device 2530 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An adjustable strap apparatus comprising:
   a left strap comprising a first rack member;
   a right strap comprising a second rack member;
   a pinion member coupled to a proximal end of a shaft, the pinion member being adapted to:
      engage the first rack member and the second rack member; and
      translate the first rack member and the second rack member in opposite directions via rotation of the shaft;
   a strap housing adapted to substantially prevent translational movement of the pinion member elative to the strap housing and maintain engagement of the pinion member with the first rack member and the second rack member;
   a battery assembly having an opening sized to allow the shalt but not the pinion member to pass through; and
   a pre-assembled housing assembly that, together with the strap housing, fully contains the battery assembly, the pre-assembled housing assembly comprising:
      a ratcheting member coupled to a distal end of the shaft, the ratcheting member comprising one or more pawls;
      a monolithic rear housing comprising:
         an integral internal gear adapted to engage the one or more pawls, the one or more pawls preventing rotation of the shaft when engaged with the integral internal gear; and
         an integral external recess,
      a knob coupled to the ratcheting member and comprising an internal recess, wherein:
         the knob is positioned within the integral external recess of the monolithic rear housing; and
         the ratcheting member and the integral internal gear of the monolithic rear housing are positioned within the internal recess of the knob; and
      one or more retaining members adapted to maintain the ratcheting member, the monolithic rear housing, and the knob in a pre-assembled configuration prior to a coupling of the pre-assembled housing assembly with the strap housing.

2. The adjustable strap apparatus of claim 1, wherein the battery assembly comprises a printed circuit board, the opening being enclosed by the printed circuit board.

3. The adjustable strap apparatus of claim 1, wherein the battery assembly comprises one or more battery cells.

4. The adjustable strap apparatus of claim 3, wherein:
   the left strap and the right strap are coupled to a head-mounted display device; and
   the one or more battery cells provide power to the head-mounted display device.

5. The adjustable strap apparatus of claim 1, wherein the battery assembly comprises a curved battery cell.

6. The adjustable strap apparatus of claim 1, wherein:
   the ratcheting member further comprises one or more radial supports, each radial support being coupled to one of the one or more pawls; and
   each of the one or more pawls is oriented tangential to an axis of rotation of the shaft.

7. The adjustable strap apparatus of claim 6, wherein:
the one or more radial supports and the one of the one or more pawls are formed from a single semi-rigid part; and
each of the one or more pawls is shaped to substantially resist a compressive force and deform in response to a bending force.

8. A head-mounted-display device comprising:
a display unit;
a display housing assembly containing the display unit;
a left strap coupled to the display housing assembly, the left strap comprising a first rack member;
a right strap coupled to the display housing assembly, the right strap comprising a second rack member;
a pinion member coupled to a proximal end of a shaft, the pinion member being adapted to:
  engage the first rack member and the second rack member; and
  translate the first rack member and the second rack member in opposite directions via rotation of the shaft;
a strap housing adapted to substantially prevent translational movement of the pinion member relative to the strap housing and maintain engagement of the pinion member with the first rack member and the second rack member;
a battery assembly having an opening sized to allow the shalt but not the pinion member to pass through; and
a pre-assembled housing assembly that, together with the strap housing, fully contains the battery assembly, the pre-assembled housing assembly comprising:
  ratcheting member coupled to a distal end of the shalt, the ratcheting member comprising one or more pawls;
  a monolithic rear housing comprising:
    an integral internal gear adapted to engage the one or more pawls, the one or more pawls preventing rotation of the shaft when engaged with the integral internal gear; and
    an integral external recess;
  a knob coupled to the ratcheting member and comprising an internal recess, wherein:
    the knob is positioned within the integral external recess of the monolithic rear housing; and
    the ratcheting member and the integral internal gear of the monolithic rear housing are positioned within the internal recess of the knob; and
  one or more retaining members adapted to maintain the ratcheting member, the monolithic rear housing, and the knob in a pre-assembled configuration prior to a coupling of the pre-assembled housing assembly with the strap housing.

9. The head-mounted-display device of claim 8, wherein the battery assembly comprises a printed circuit board, the opening being enclosed by the printed circuit board.

10. The head-mounted-display device of claim 8, wherein the battery assembly comprises one or more battery cells.

11. The head-mounted-display device of claim 8, wherein the battery assembly comprises a curved battery cell.

12. An adjustable strap apparatus comprising:
a left strap;
a right strap;
a translation member coupled to a proximal end of a shaft, the translation member being adapted to:
  engage the left strap and the right strap; and
  translate the left strap and the right strap in opposite directions via rotation of the shaft;
a strap housing adapted to substantially prevent translational movement of the translation member relative to the strap housing and maintain engagement of the translation member with the left strap and the right strap;
a battery assembly having an opening sized to allow the shaft but not the translation member to pass through; and
a pre-assembled housing assembly that, together with the strap housing, fully contains the battery assembly, the pre-assembled housing assembly comprising:
  a monolithic rear housing comprising:
    a first retaining member; and
    an external recess;
  a second retaining member coupled to a distal end of the shaft, the second retaining member adapted to prevent rotation of the shaft in at least one direction when engaged with the first retaining member of the monolithic rear housing; and
  a knob coupled to the second retaining member and comprising an internal recess, wherein:
    the knob is positioned within the external recess of the monolithic rear housing; and
    the first retaining member and the second retaining member are positioned within the internal recess of the knob; and
  a third retaining member adapted to maintain the second retaining member, the monolithic rear housing, and the knob in a pre-assembled configuration prior to a coupling of the pre-assembled housing assembly with the strap housing.

13. The adjustable strap apparatus of claim 12, wherein:
the left strap comprises a first gear rack;
the right strap comprises a second gear rack; and
the translation member comprises one or more pinion gears adapted to:
  engage the first gear rack and the second gear rack; and
  translate the first strap and the second strap in opposite directions via rotation of the shaft.

14. The adjustable strap apparatus of claim 12, wherein:
the battery assembly comprises one or more battery cells;
the first retaining member comprises an integral internal gear; and
the second retaining member comprises a ratcheting member.

15. The adjustable strap apparatus of claim 1, wherein a surface of the knob is flush with a surface of the monolithic rear housing.

16. The adjustable strap apparatus of claim 1, wherein the pinion member and the shaft are two components of a single monolithic element.

17. The head-mounted-display device of claim 8, wherein a surface of the knob is flush with a surface of the monolithic rear housing.

18. The head-mounted-display device of claim 8, wherein the pinion member and the shaft are two components of a single monolithic element.

19. The adjustable strap apparatus of claim 12, wherein a surface of the knob is flush with a surface of the monolithic rear housing.

20. The adjustable strap apparatus of claim 12, wherein the translation member and the shaft are two components of a single monolithic element.

21. An adjustable strap apparatus comprising:
a left strap comprising a first rack member;
a right strap comprising a second rack member;

a pinion member, the pinion member having a diameter such that the pinion member is adapted to:
  engage the first rack member and the second rack member; and
  translate the first rack member and the second rack member in opposite directions via rotation of the pinion member;
a front housing maintaining engagement of the pinion member with the first rack member and the second rack member; and
a pre-assembled rear-housing assembly comprising:
  a ratcheting member comprising one or more pawls;
  a monolithic rear housing comprising:
    an integral internal gear adapted to engage the one or more pawls, the one or more pawls, when engaged with the integral internal gear, preventing rotation of the pinion member; and
    an integral external recess;
  a knob coupled to the ratcheting member and comprising an internal recess, wherein the knob is positioned within the integral external recess of the monolithic rear housing, and the ratcheting member and the integral internal gear of the monolithic rear housing are positioned within the internal recess of the knob; and
  one or more retaining members adapted to maintain the ratcheting member, the monolithic rear housing, and the knob in a pre-assembled configuration prior to a coupling of the pre-assembled rear-housing assembly with the front housing; and
a battery assembly having an opening sized smaller than the diameter of the pinion member, wherein the opening allows the pinion member to couple with the ratcheting member and the knob, and the front housing and the pre-assembled rear-housing assembly together fully contain the battery assembly.

22. The adjustable strap apparatus of claim 21, wherein the pinion member comprises a shaft, and the shaft is coupled to the ratcheting member.

23. The adjustable strap apparatus of claim 21, wherein the battery assembly comprises a battery pack.

24. The adjustable strap apparatus of claim 21, wherein:

the left strap and the right strap are coupled to a head-mounted display device; and the battery pack provides power to the head-mounted display device.

* * * * *